(12) United States Patent
Norkin

(10) Patent No.: US 10,244,265 B2
(45) Date of Patent: Mar. 26, 2019

(54) HIERARCHICAL DEBLOCKING PARAMETER ADAPTATION

(71) Applicant: Telefonaktiebolaget L M Ericsson (publ), Stockholm (SE)

(72) Inventor: Andrey Norkin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 201 days.

(21) Appl. No.: 14/431,894

(22) PCT Filed: Oct. 2, 2013

(86) PCT No.: PCT/SE2013/051147
§ 371 (c)(1),
(2) Date: Mar. 27, 2015

(87) PCT Pub. No.: WO2014/055020
PCT Pub. Date: Apr. 10, 2014

(65) Prior Publication Data
US 2015/0249842 A1  Sep. 3, 2015

Related U.S. Application Data

(60) Provisional application No. 61/709,542, filed on Oct. 4, 2012.

(51) Int. Cl.
*H04N 19/31* (2014.01)
*H04N 19/30* (2014.01)
(Continued)

(52) U.S. Cl.
CPC ........... *H04N 19/86* (2014.11); *H04N 19/117* (2014.11); *H04N 19/146* (2014.11);
(Continued)

(58) Field of Classification Search
CPC ................................. H04N 7/12; H04N 19/65
(Continued)

(56) References Cited

U.S. PATENT DOCUMENTS

2006/0126962 A1* 6/2006 Sun .................. H04N 19/139
382/268
2008/0137753 A1* 6/2008 He .................... H04N 19/139
375/240.24

(Continued)

FOREIGN PATENT DOCUMENTS

WO          2012096614 A2       7/2012

OTHER PUBLICATIONS

Van Der Auwera, Geert et al., "Traffic and Quality Characterization of Single-Layer Video Streams Encoded with the H.264/MPEG-4 Advanced Video Coding Standard and Scalable Video Coding Extension", IEEE Transactions on Broadcasting, vol. 54, No. 3, Sep. 2008, 698-718.

(Continued)

*Primary Examiner* — Tracy Y. Li
(74) *Attorney, Agent, or Firm* — Sage Patent Group

(57) ABSTRACT

A value of a deblocking parameter is determined for a picture (40) based on a depth of the picture (40) in a hierarchical coding structure of multiple pictures (40) in a video sequence (1). The determined value is encoded to form an encoded value that is sent to a decoder (85, 95, 400, 500, 600, 800) for use therein during decoding. The embodiments thereby reduces blocking artifacts, which otherwise can occur in video sequences with hierarchical coding structures, such as for QP toggling and multilayer/view video, by determining deblocking parameter values based on picture depth in the hierarchical coding structure.

14 Claims, 10 Drawing Sheets

(51) Int. Cl.
  *H04N 19/86* (2014.01)
  *H04N 19/117* (2014.01)
  *H04N 19/82* (2014.01)
  *H04N 19/146* (2014.01)
  *H04N 19/172* (2014.01)
  *H04N 19/196* (2014.01)

(52) U.S. Cl.
  CPC ......... *H04N 19/172* (2014.11); *H04N 19/196* (2014.11); *H04N 19/30* (2014.11); *H04N 19/31* (2014.11); *H04N 19/82* (2014.11)

(58) Field of Classification Search
  IPC ...................................................... H04N 19/86
  See application file for complete search history.

(56) References Cited

U.S. PATENT DOCUMENTS

| | | | |
|---|---|---|---|
| 2010/0220796 A1* | 9/2010 | Yin | H04N 19/159 375/240.29 |
| 2011/0170610 A1* | 7/2011 | Min | H04N 19/139 375/240.24 |
| 2014/0050413 A1* | 2/2014 | Sato | G06T 9/00 382/233 |

OTHER PUBLICATIONS

Wien, Mathias et al., "Performance Analysis of SVC", Joint Video Team of ISO/IEC JTC1/SC29/WG11 and ITU-T SG.16, No. JVT-U141, Hangzhou, China, Oct. 20-27, 2006, 1-10.

* cited by examiner

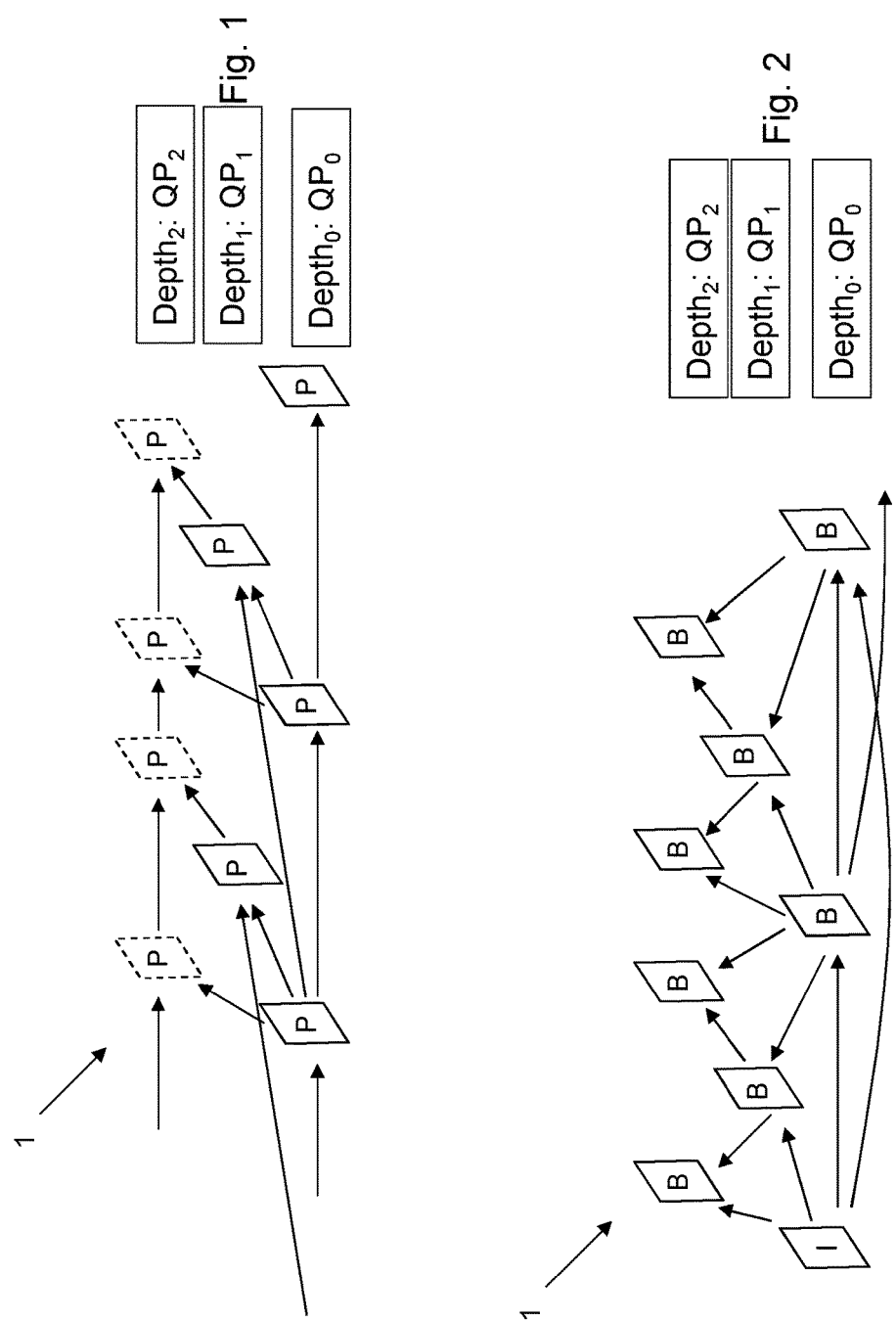

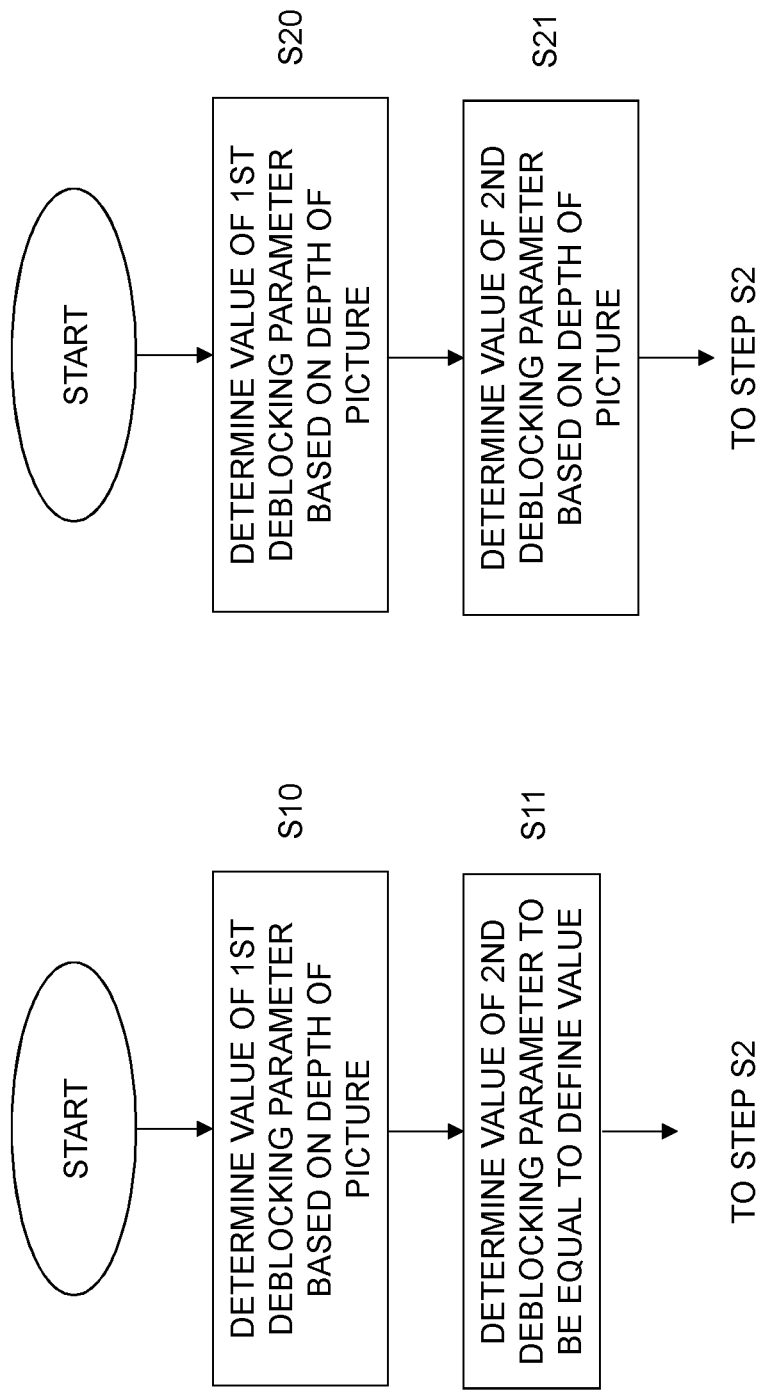

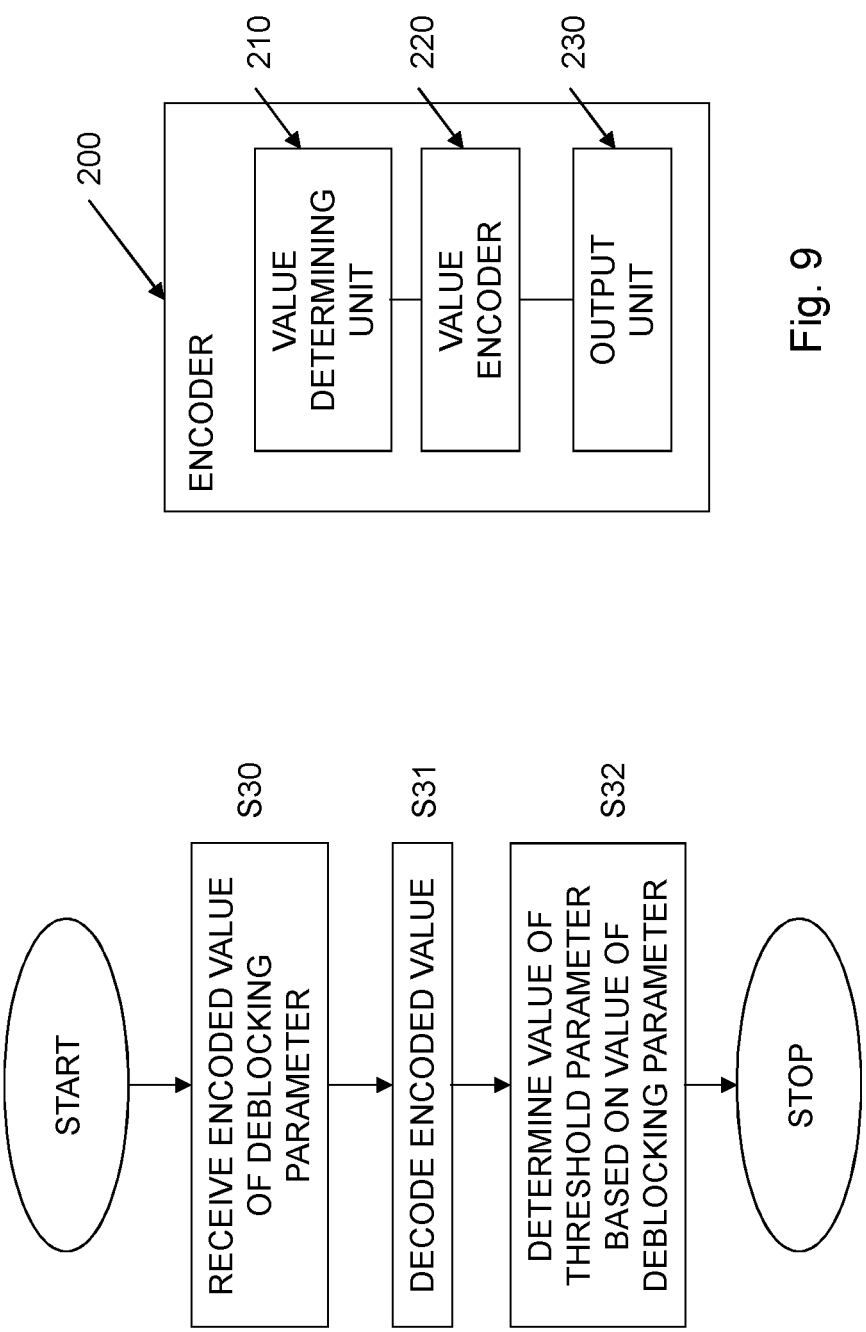

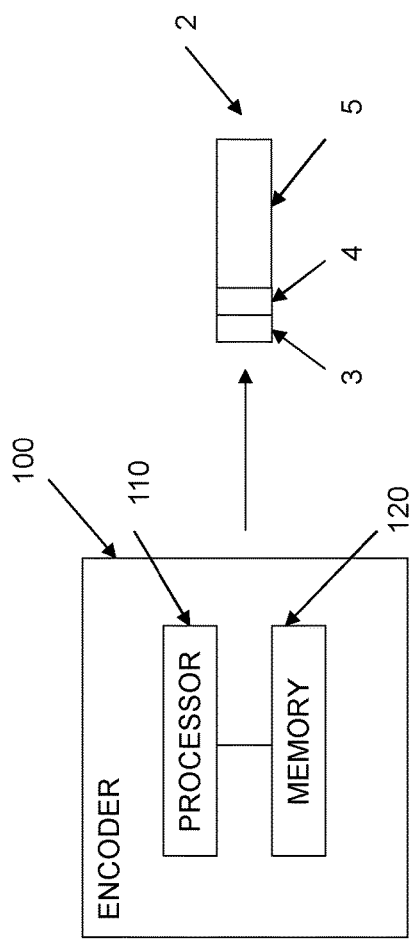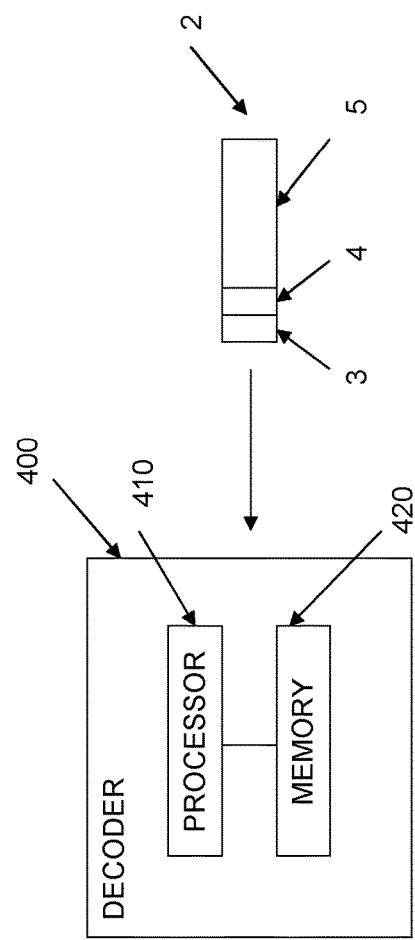

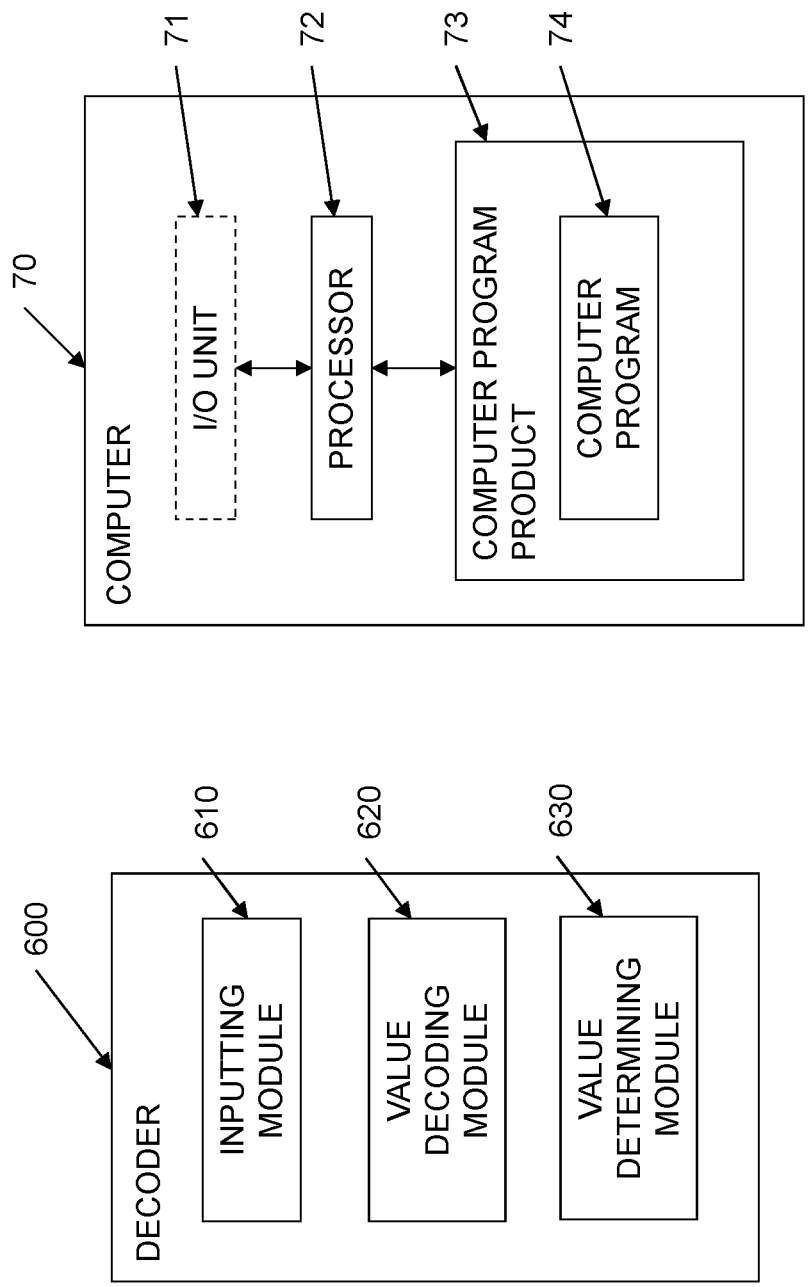

HIERARCHICAL DEBLOCKING PARAMETER ADAPTATION

TECHNICAL FIELD

The present embodiments generally relate to encoding and decoding pictures of a video sequence, and in particular to determining deblocking parameters in connection with encoding and decoding of pictures.

BACKGROUND

Deblocking filters are used in video coding standards in order to combat blocking artifacts. The blocking artifacts arise because the original video is split into blocks which are processed relatively independently. The blocking artifacts can arise due to different intra prediction of blocks, quantization effects and motion compensation. Two particular variants of deblocking are described below.

These descriptions assume a vertical block boundary or border. The process is also done in the same way for horizontal block boundaries.

H.264 Deblocking

In state of the art video coding such as H.264 there is an adaptive de-blocking filter/loop filter after prediction and residual reconstruction, but before storage of the reconstruction for later reference when encoding or decoding subsequent frames. The deblocking filtering consists of several steps such as filter decisions, filtering operations, a clipping function and changes of pixel values. The decision to filter the border or not is made based on evaluating several conditions. Filter decisions depend on macro block (MB) type, motion vector (MV) difference between neighboring blocks, whether neighboring blocks have coded residuals and on the local structure of the current and/or neighboring blocks.

The amount of filtering for a pixel depends on the position of that pixel relative to the block boundary and on the quantization parameter (QP) value used for residual coding. Here below a to h represent pixel values across a vertical block boundary.

a b c d|e f g h

The filter decision is based on comparing three pixel differences with three thresholds. The thresholds are adapted to the QP.

If the following conditions are fulfilled the filtering is done:

$abs(d-e) < thr1$, $abs(c-d) < thr2$, and $abs(e-f) < thr2$ where thr1 and thr2 are functions of QP.

There are two filtering modes in H.264. In the first filtering mode (normal filtering), filtering can be described with a delta value that the filtering changes the current pixel value with. The filtering for the pixel closest to the block boundary is:

$d' = d + delta$ and $e' = e - delta$ where delta has been clipped off to a threshold $\pm thr3$ to a value that is constrained by the QP. d' is here the pixel value at position d after filtering and e' is the pixel value after filtering at position e. More filtering is allowed for high QP than for low QP.

Clipping can be described as:

$delta\_clipped = \max(-thr3, \min(thr3, delta))$ where thr3 is controlling the filter strength. A larger value of thr3 means that the filtering is stronger, which in turns means that a stronger low-pass filtering effect will happen.

The filter strength can be increased if any of the following two conditions also holds:

$abs(b-d) < thr2$ and $abs(e-g) < thr2$

The filter strength is adapted by clipping the delta less, e.g. to allow for more variation.

The second filtering mode (strong filtering) is applied for intra macroblock boundaries only, when the following condition is fulfilled:

$abs(d-e) < thr1/4$.

The thresholds thr1, thr2 and thr3 are derived from table lookup using QP as index. Each slice can contain modifications of thr2 and thr3 using slice_beta_offset_div2 and thr1 using slice_alpha_c0_offset_div2. The slice parameters 2×slice_beta_offset_div2 and 2×slice_alpha_c0_offset_div2 are added to the current QP index before table lookup of thr2/thr3 and thr1 respectively.

Deblocking in HEVC Draft

Here below $p_0$ to $p_3$ and $q_0$ to $q_3$ represent pixel values across a vertical block boundary.

$p_3\ p_2\ p_1\ p_0 | q_0\ q_1\ q_2\ q_3$

In the draft HEVC specification, the deblocking filter works differently than H.264. The filtering is performed if at least one of the blocks on the side of the border is intra, or has non-zero coefficients, or the difference between the motion vector components of the blocks is greater than or equal to one integer pixel. For example, if one is filtering the border between the blocks A and B below, then the following condition should satisfy for the block boundary to be filtered:

| A | | | | B | | | |
|---|---|---|---|---|---|---|---|
| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |

$dp0 = |p2_0 - 2 \times p1_0 + p0_0|$ $dp3 = |p2_3 - 2 \times p1_3 + p0_3|$ $dq0 = |q2_0 - 2 \times q1_0 + q0_0|$ $dq3 = |q2_3 - 2 \times q1_3 + q0_3|$ $dpq0 = dp0 + dq0$ $dpq3 = dp3 + dq3$ $dp = dp0 + dp3$ $dq = dq0 + dq3$     (1)

The variable d is derived as follows:

$d = dpq0 + dpq3$     (2)

The deblocking filtering is performed on the block boundary for lines i=0 . . . 3 if the following condition holds:

$d < \beta$     (3)

where $\beta$ depends on the quantization parameter. In the draft HEVC specification, there is a table, see Table 1 below, for looking up the value of β using Q as the table index. β increases with increasing quantization parameter.

If the condition in equation (3) above is fulfilled and filtering is done between blocks A and B, one of two types of filtering (weak or strong filtering) is performed. The choice between the strong and the weak filtering is done separately for each line depending on the following conditions. For lines i=0, 3, strong filtering is performed if all the following conditions are true, otherwise, weak filtering is performed:

$$2 \times dpq_i < (\beta >> 2) \quad (4)$$

$$\text{and } (|p3_i - p0_i| + |q0_i - q3_i|) < (\beta >> 3) \quad (5)$$

$$\text{and } |p0_i - q0_i| < ((5 * t_C + 1) >> 1), \quad (6)$$

where $t_C$ and β depend on qP. Their relations are shown in Table 1 and further below.

TABLE 1

Derivation of threshold variables β' and $t_c'$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β' | 0 | 0 | 0 | 0 | 0 | 0 | 0 | 0 | 0 | 0 | 0 | 0 | 0 | 0 | 0 | 0 | 6 | 7 | 8 |
| $t_c'$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β' | 9 | 10 | 11 | 12 | 13 | 14 | 15 | 16 | 17 | 18 | 20 | 22 | 24 | 26 | 28 | 30 | 32 | 34 | 36 |
| $t_c'$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| β' | 38 | 40 | 42 | 44 | 46 | 48 | 50 | 52 | 54 | 56 | 58 | 60 | 62 | 64 | 64 | 64 | 64 | 64 |
| $t_c'$ | 5 | 5 | 6 | 6 | 7 | 8 | 9 | 9 | 10 | 10 | 11 | 11 | 12 | 12 | 13 | 13 | 14 | 14 |

The value of the variable β' is determined as specified in Table 1 based on the parameter Q derived as:

$$Q = \text{Clip3}(0, 51, qP + (\text{beta\_offset\_div2} << 1))$$

where qP is an average quantization parameter (QP) and beta_offset_div2 is the value of the variable beta_offset_div2 for the slice that contains the sample $q0_0$.

The variable β is derived as:

$$\beta = \beta' \times (1 << (\text{BitDepth}-8))$$

The value of the variable tc' is determined as specified in Table 1 based on the parameter Q derived as:

$$Q = \text{Clip3}(0, 53, qP + 2 \times (bS-1) + (tc\_\text{offset\_div2} << 1))$$

where qP is an average quantization parameter (QP) and tc_offset_div2 is the value of the variable tc_offset_div2 for the slice that contains sample $q0_0$. Parameter bS is the boundary strength of the block boundary, which takes value 2 when one of the adjacent blocks is intra-predicted and value 1 in the other cases when the block boundary is processed by the deblocking filter (when bS is equal to 0, the block boundary is not processed by the deblocking filter).

The variable tc is derived as:

$$tc = tc' \times (1 << (\text{BitDepth}-8))$$

The parameters beta_offset_div2 and tc_offset_div2 are sent in the slice header or in a picture parameter set (PPS) as shown in the following.

Sequence Parameter Set RBSP Syntax

| seq_parameter_set_rbsp( ) { | Descriptor |
|---|---|
| ... | |
| bit_depth_luma_minus8 | ue(v) |
| bit_depth_chroma_minus8 | ue(v) |
| ... | |

Picture Parameter Set RBSP Syntax

| pic_parameter_set_rbsp( ) { | Descriptor |
|---|---|
| ... | |
| pic_init_qp_minus26 | se(v) |
| constrained_intra_pred_flag | u(1) |

-continued

| pic_parameter_set_rbsp( ) { | Descriptor |
|---|---|
| transform_skip_enabled_flag | u(1) |
| cu_qp_delta_enabled_flag | u(1) |
| if ( cu_qp_delta_enabled_flag ) | |
|   diff_cu_qp_delta_depth | ue(v) |
| pic_cb_qp_offset | se(v) |
| pic_cr_qp_offset | se(v) |
| pic_slice_level_chroma_qp_offsets_present_flag | u(1) |
| ... | |
| deblocking_filter_control_present_flag | u(1) |
| if( deblocking_filter_control_present_flag ) { | |
|   deblocking_filter_override_enabled_flag | u(1) |
|   pps_disable_deblocking_filter_flag | u(1) |
|   if( !pps_disable_deblocking_filter_flag ) { | |
|     beta_offset_div2 | se(v) |
|     tc_offset_div2 | se(v) |
|   } | |
| } | |
| ... | |

General Slice Header Syntax

| slice_header( ) { | Descriptor |
|---|---|
| ... | |
| slice_qp_delta | se(v) |
| if( pic_slice_level_chroma_qp_offsets_present_flag ) { | |

-continued

| slice_header( ) { | Descriptor |
|---|---|
|     slice_cb_qp_offset | se(v) |
|     slice_cr_qp_offset | se(v) |
|   } | |
|   if( deblocking_filter_control_present_flag ) { | |
|     if( deblocking_filter_override_enabled_flag ) | |
|       deblocking_filter_override_flag | u(1) |
|     if( deblocking_filter_override_flag ) { | |
|       slice_header_disable_deblocking_filter_flag | u(1) |
|       if( !slice_header_disable_deblocking_filter_flag ) { | |
|         beta_offset_div2 | se(v) |
|         tc_offset_div2 | se(v) |
|       } | |
|     } | |
|   } | |
| ... | | slice_qp_delta specifies the initial value of QP to be used for the coding blocks in the slice until modified by the value of CuQpDelta in the coding unit layer. The initial QP quantization parameter for the slice is computed as:

SliceQP=26+pic_init_qp_minus26+slice_qp_delta

The value of slice_qp_delta shall be limited such that SliceQP is in the range of −QpBdOffset to +51, inclusive.

The two filtering modes (weak and strong filtering) in the HEVC draft look like in the following:

Weak Filtering

Weak filtering is performed based on the above conditions. The actual filtering works by computing an offset ($\Delta$) for each of the lines i that the weak filter has been selected for. The following weak filtering procedure is applied for every line, where it has been chosen. In the following algorithm, the variables p0 . . . p2 and q0 . . . q2 are assigned the following values (from row/column i) where p0=p0$_i$, p1=p1$_i$, p2=p2$_i$, q0=q0$_i$, q1=q1$_i$, q2=q2$_i$. One can see that if the weak filtering is performed, one to two pixels are modified at each side of the block boundary:

```
Δ = ( 9×( q0 − p0 ) − 3×( q1 − p1) + 8 ) >> 4
if( abs( Δ ) < 10×t_c )
{
    Δ = Clip3( −t_c, t_c, Δ )
    p0' = Clip1_Y( p0 + Δ )
    q0' = Clip1_Y( q0 − Δ )
    if( dp < ( β + ( β >> 1 ) ) >> 3 )
    {
        Δp = Clip3( −( tc >> 1 ), tc >> 1, ( ( ( p2 + p0 + 1 ) >> 1 ) −
        p1 + Δ ) >>1 )
        p1' = Clip1_Y( p1 + Δp)
    }
    if( dq < ( β + (β >> 1 ) ) >> 3 )
    {
        Δq = Clip3( −( tc >> 1 ), tc >> 1, ( ( ( q2 + q0 + 1 ) >> 1 ) −
        q1 − Δ ) >>1 )
        q1' = Clip1_Y( q1 + Δq )
    }
}
``` where Clip is defined as $x'$=Clip3$(A,B,x)$, $x'=x$ or if $x<A$ then $x'=A$ or if $x>B$ then $x'=B$ and Clip1$_Y(x)$=Clip3$(0,(1<<\text{BitDepth}_Y)-1,x)$ where BitDepth$_Y$ is the bit depth, for example 8 or 10.

Clipping operations are used in deblocking to avoid excessive filtering. The clipping parameter $t_C$ is derived from Table 1 and depends on the average of the quantization parameter QP of the two adjacent blocks which determines how coarse the quantization is. The clipping parameter $t_C$ determines what are the maximum allowed modifications to the sample value. Hence, larger values of $t_C$ have an effect of allowing stronger modifications to the sample values by the deblocking filtering, whereas a lower value of $t_C$ decreases the allowed modifications of samples by deblocking and therefore results in weaker filtering.

Strong Filtering

Strong filtering mode is performed for a line i of pixels by the following set of operations, where p0=p0$_i$, p1=p1$_i$, p2=p2$_i$, q0=q0$_i$, q1=q1$_i$, q2=q2$_i$:

$p0'$=Clip3$(p0-2\times tc, p0+2\times tc, (p2+2\times p1+2\times p0+2\times q0+q1+4)>>3)$ $p1'$=Clip3$(p1-2\times tc, p1+2\times tc, (p2+p1+p0+q0+2)>>2)$ $p2'$=Clip3$(p2-2\times tc, p2+2\times tc, (2\times p3+3\times p2+p1+p0+q0+4)>>3)$ $q0'$=Clip3$(q0-2\times tc, q0+2\times tc, (p1+2\times p0+2\times q0+2\times q1+q2+4)>>3)$ $q1'$=Clip3$(q1-2\times tc, q1+2\times tc, (p0+q0+q1+q2+2)>>2)$ $q2'$=Clip3$(q2-2\times tc, q2+2\times tc, (p0+q0+q1+3\times q2+2\times q3+4)>>3)$ The quantization parameter (QP) controls the bitrate and the fidelity of the video signal. In a hybrid codec, the QP is used for quantizing and de-quantizing transform coefficients that contain residual data after prediction. A low QP value will result in low coding distortion but will also result in a lot of coefficients that will cost a lot of bits. A high QP results in less coefficients, which will result in high coding distortion but will not cost many bits to code.

The slice QP specifies the initial value of the QP to be used for the macroblocks/coding units (CUs) in the slice. The slice QP is used for the first macroblock/CU in the slice. Then delta QP syntax elements are sent between each macroblock/CU to change the QP value. Typically, a delta QP is only sent for macroblocks/CUs that contain transform coefficients. No delta QP is sent for blocks that do not contain coefficients since the QP value then has no impact on the pixel reconstruction process.

It may happen that all delta QP values are zero. In this case, the slice QP is used for all blocks in the entire slice.

It is well known that subjective video compression gains can be achieved by using what is called adaptive QP where the quantization parameter (QP) is changed within pictures. Applying a low QP in an area will generate more bits compared to a higher QP but the coding distortion will be lower. A lower QP can be used on areas that have smooth textures and a higher QP can be used where the spatial activity is higher. This is a good idea since the human visual system will easily detect distortion in a smooth area, while the same amount of distortion in a highly textured area will go unnoticed. However, the range of the QP adaptation in the slice is limited and depends on the initial value of the slice/picture QP.

In video coding, hierarchical coding structures are often used. The hierarchical QP coding often uses higher values of QP for coding of pictures/slices, which are higher in the coding hierarchy, and might be used together with or without decoding picture order rearrangement. Hierarchical QP coding, i.e. QP toggling, usually results in higher objective and subjective quality of the coded video. The adjustment of quality can be done by using higher value of initial QP delta as well as using adjustment to the Lagrange multiplier λ used in the rate-distortion optimization.

One of the problems with hierarchical coding structures is that the pictures/slices, which lay higher up in the hierarchy, are coded with lower quality. Since these pictures are often coded with higher values of initial picture QP and/or slice QP, the deblocking thresholds automatically adapt to this coding structure since the higher value of QP is used with higher depth in the coding hierarchy and thresholds are QP dependent. However, since the quality of pictures in the higher layers of hierarchy is decreased, some blocking artifacts can still be visible, especially on the large transform size grid. Moreover, using higher values of Lagrange multiplier λ in the rate-distortion optimization when coding pictures with greater depth in the coding hierarchy can further reduce the quality of these pictures and makes it more difficult for deblocking to attenuate the blocking artifacts.

SUMMARY

It is a general objective to provide an efficient encoding and decoding of pictures of a video sequence.

This and other objectives are met by embodiments disclosed herein.

An aspect of the embodiments relates to a method performed by an encoder for a video sequence comprising multiple pictures having a respective depth in a hierarchical coding structure. The method comprises determining, for a picture of the video sequence, a value of a deblocking parameter based on a depth of the picture in the hierarchical coding structure. The method also comprises encoding the value of the deblocking parameter to form an encoded value of the deblocking parameter and sending the encoded value to a decoder.

A related aspect of the embodiments defines an encoder operable to determine, for a picture of a video sequence comprising multiple pictures having a respective depth in a hierarchical coding structure, a value of a deblocking parameter based on a depth of the picture in the hierarchical coding structure. The encoder is also operable to encode the value of the deblocking parameter to form an encoded value of the deblocking parameter and send the encoded value to a decoder.

Another related aspect of the embodiments defines an encoder comprising a value determining module for determining, for a picture of a video sequence comprising multiple pictures having a respective depth in a hierarchical coding structure, a value of a deblocking parameter based on a depth of the picture in the hierarchical coding structure. The encoder also comprises a value encoding module for encoding the value of the deblocking parameter to form an encoded value of the deblocking parameter. The encoder further comprises an outputting module for sending the encoded value to a decoder.

A further related aspect of the embodiments defines a computer program comprising code means which, when executed by a processor, causes the processor to determine, for a picture of a video sequence comprising multiple pictures having a respective depth in a hierarchical coding structure, a value of a deblocking parameter based on a depth of the picture in the hierarchical coding structure. The computer program also causes the processor to encode the value of the deblocking parameter to form an encoded value of the deblocking parameter and send the encoded value to a decoder.

Yet another related aspect of the embodiments defines a computer program product comprising computer readable code means and a computer program according to above stored on the computer readable code means.

Another aspect of the embodiments relates to a method performed by a decoder for a video sequence comprising multiple pictures having a respective depth in a hierarchical coding structure. The method comprises receiving an encoded value of a deblocking parameter and decoding the encoded value to form a value of the deblocking parameter. The method also comprises determining, for a picture of the video sequence, a value of a threshold parameter based on the value of the deblocking parameter, wherein the value of the deblocking parameter is determined based on a depth of the picture in the hierarchical coding structure.

A related aspect of the embodiments defines a decoder operable to receive an encoded value of a deblocking parameter and decode the encoded value to form a value of the deblocking parameter. The decoder is also operable to determine, for a picture of a video sequence comprising multiple pictures having a respective depth in a hierarchical coding structure, a value of a threshold parameter based on the value of the deblocking parameter. The value of the deblocking parameter is determined based on a depth of the picture in the hierarchical coding structure.

Another related aspect of the embodiments defines a decoder comprising an inputting module for receiving an encoded value of a deblocking parameter and a value decoding module for decoding the encoded value for form a value of the deblocking parameter. The decoder also comprises a value determining module for determining, for a picture of a video sequence comprising multiple pictures having a respective depth in a hierarchical coding structure, a value of a threshold parameter based on the value of the deblocking parameter. The value of the deblocking parameter is determined based on a depth of the picture in the hierarchical coding structure.

Further related aspect of the embodiments comprise a user terminal comprising an encoder according to above and/or a decoder according to above and a network device being or belonging to a network node in a communication network. The network device comprises an encoder according to above and/or a decoder according to above.

BRIEF DESCRIPTION OF THE DRAWINGS

The embodiments, together with further objects and advantages thereof, may best be understood by making reference to the following description taken together with the accompanying drawings, in which:

FIG. 1 is an example of a video sequence with a hierarchical layer structure;

FIG. 2 is another example of a video sequence with a hierarchical layer structure;

FIG. 5 is a flow diagram illustrating an embodiment of determining a value in FIG. 4;

FIG. 6 is a flow diagram illustrating another embodiment of determining a value in FIG. 4;

FIG. 7 is a flow diagram of a method performed by a decoder according to an embodiment;

FIG. 8 is a schematic block diagram of an encoder according to an embodiment;

FIG. 9 is a schematic block diagram of an encoder according to another embodiment;

FIG. 11 is a schematic block diagram of a decoder according to an embodiment;

FIG. 13 is a schematic block diagram of a decoder according to a further embodiment;

FIG. 14 is a schematic block diagram of a computer according to an embodiment;

DETAILED DESCRIPTION

Throughout the drawings, the same reference numbers are used for similar or corresponding elements.

The present embodiments generally relate to encoding and decoding pictures of a video sequence, and in particular to determining deblocking parameters in connection with encoding and decoding of pictures.

Blocking artifacts as seen in the prior art using a hierarchical coding structure can be visibly reduced according to the embodiments. Generally, the value of a deblocking parameter for a picture is determined based on a depth of the picture in the hierarchical coding structure. This means that pictures with different depths in the hierarchical coding structure may have different values of their respective deblocking parameter. The deblocking parameter or parameters of the embodiments is or are sometimes also referred to as deblocking offset parameter or parameters or as deblocking parameter offset or offsets.

Figure 4:
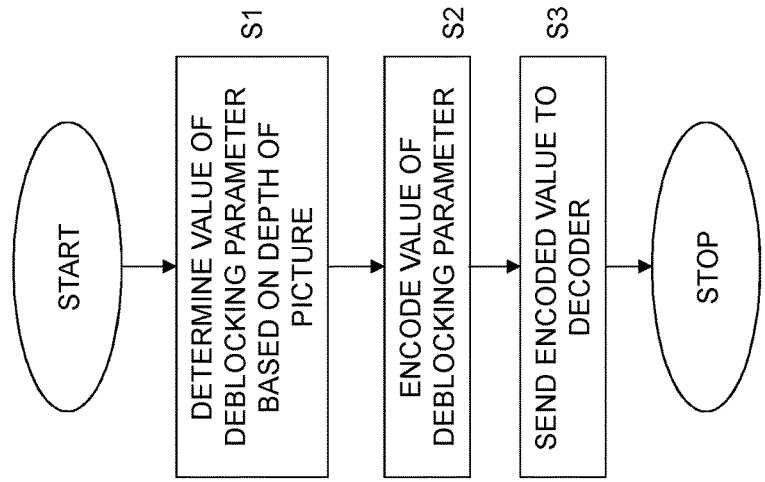
FIG. 4 is a flow diagram of a method performed by an encoder according to an embodiment.

An aspect of the embodiments relates to a method performed by an encoder for a video sequence comprising multiple pictures having a respective depth in a hierarchical coding structure. FIG. 4 is a flow diagram illustrating an embodiment of such a method. Step S1 comprises determining, for a picture of the video sequence, a value of a deblocking parameter based on a depth of the picture in the hierarchical coding structure. A following step S2 comprises encoding the value of the deblocking parameter to form an encoded value of the deblocking parameter. Finally, step S3 comprises sending the encoded value to a decoder.

The multiple pictures in the video sequence are organized or otherwise defined in a hierarchical coding structure. Hierarchical coding structure implies, as the expression indicates, that there is a relationship in how the pictures in the video sequences are coded or that there is a relationship among coding parameters for the pictures.

A typical, but non-limiting, example is a video sequence encoded according to the High Efficiency Video Coding (HEVC), also referred to as H.265, main profile. In such an example, all pictures of the video sequence are typically regarded as belonging to a single layer, generally denoted layer 0 or base layer. A hierarchical coding structure with multiple different depths, also referred to herein as depth levels, can be used in the HEVC main profile. This means that even if the pictures of the video sequence are regarded as belonging to the same layer (layer 0) the pictures may have different depths and thereby belong to different depth layers. As a consequence, a first set of one or more pictures in the video sequence belongs to a first depth layer, a second set of one or more pictures in the video sequence belongs to a second depth layer having a different depth in the hierarchical coding structure as compared to the first depth layer, and so on.

Another non-limiting example is that the pictures of a coded video sequence are organized into multiple layers. Hence, the video sequence is thereby a so-called multi-layer video sequence. The organization of the pictures into multiple layers can be due to various purposes, such as to achieve temporal scalability, multi-view video, etc. In the case of temporal scalability the multi-layer video sequence typically comprises a so-called base layer and one or more additional layers or so-called enhancement layers. A similar approach is taken in multi-view video, including stereoscopic video, with a so-called base view or layer and one or more additional views or layers with pictures. Scalable video coding could, for instance, be according to Scalable High Efficiency Video Coding (SHVC) and multi-view video coding could, for instance, be according to Multi-View High Efficiency Video Coding (MV-HEVC).

The hierarchical coding structure implies that pictures in the base layer or view are encoded and decoded based on data, i.e. reference pictures, present in the base layer or view. A picture in an enhancement layer or additional view can, however, be encoded and decoded based on reference pictures present in the current enhancement layer or additional view or in a lower layer or view within the hierarchical coding structure.

Each layer in the hierarchical coding structure has a respective depth denoted $depth_0$ to $depth_2$ in FIGS. 1 and 2. Generally, the base layer or view has the lowest depth in the hierarchical coding structure with increasing depths for the enhancement layers or additional views as one move upwards in the hierarchical coding structure.

This means that each layer preferably has a respective depth level in the hierarchical coding structure. It could a one-to-one relationship between the number of layers and the number of depth levels implying that each layer in the coded video sequence has a respective depth level with associated depth that is different from the depth of another layer in the coded video sequence. It could, alternatively, be possible that at least two of the layers in the coded video sequence have a same depth and could therefore be regarded as belonging to the same depth level in the hierarchical coding structure.

Sometimes the expression hierarchical prediction structure is used to denote the hierarchical coding structure in a multi-layer video to indicate that the hierarchy is, at least partly, dictated or defined based on how pixel values in pictures can be predicted from pixel value in reference pictures in the same or lower layers in the hierarchical coding structure.

Hence, in these embodiments the video sequence is a multi-layer video sequence comprising multiple layers having different depths in the hierarchical coding structure. Step S1 of FIG. 4 then preferably comprises determining, for the picture of the multi-layer video sequence, the value of the deblocking parameter based on a depth of a layer, to which the picture belongs, of the multiple layers in the hierarchical coding structure.

Another example of a hierarchical coding structure is a so-called hierarchical quantization parameter (QP) coding structure. Thus, hierarchical QP coding, also denoted QP toggling in the art, could be used for the pictures in the video sequence. Such QP toggling can be used together with video sequence having a single layer of pictures or a multi-layer video sequence.

FIG. 1 represents an example of a low-delay hierarchical structure. Pictures in higher depth layers use higher values of initial quantization parameter, i.e. $QP_2>QP_1>QP_0$ (or sometimes $QP_2 \geq QP_1 \geq QP_0$). FIG. 2 illustrates a "hierarchical B" coding structure with temporal layers and decoding order rearrangement. Pictures in higher depth layers use higher values of initial QP, i.e. $QP_2>QP_1>QP_0$ (or sometimes $QP_2 \geq QP_1 \geq QP_0$). In this example, different depths also correspond to different temporal layers, e.g. $depth_0$—temporal layer 0, $depth_1$—temporal layer 1 and depth 2 to temporal layer 2. FIGS. 1 and 2 indicate the coding and decoding relationships between pictures with arrows.

QP toggling can, however, be used on its own, i.e. without a hierarchical prediction structure or a flat prediction structure. The hierarchical QP coding structure could then be regarded as a varying QP coding structure where pictures have different "positions" or depths in the hierarchical QP coding structure based on the respective initial QP values of the pictures. Thus, the pictures belong to different depth levels in the hierarchical (QP) coding structure. This means that QP toggling can be applied, for instance, to HEVC main profile but also to SHVC and MV-HEVC.

Hence, in these embodiments the hierarchical coding structure is a hierarchical QP coding structure. The multiple pictures of the video sequence have a respective initial QP value in the hierarchical QP coding structure. Step S1 of FIG. 4 then comprises determining, for the picture of the video sequence, the value of the deblocking parameter based on an initial QP value of the picture in the hierarchical QP coding structure.

Thus, there is, in these embodiments, a one-to-one relationship between initial QP value of a picture and a depth of that picture in the hierarchical QP coding structure. Generally, hierarchical QP coding uses higher values of initial QP for coding pictures that are higher in the coding hierarchy.

In an embodiment, the initial QP value is represented by the previously mentioned parameter or syntax element slice_qp_delta. This syntax element specifies the initial value of QP to be used for a block of pixels, generally denoted coding unit or block, in the slice of the picture until modified by the value of CuQpDelta in the coding unit layer. The initial value of the QP quantization parameter for the slice of the picture is computed as SliceQP=26+pic_init_qp_minus26+slice_qp_delta.

In another embodiment, the initial QP value is represented by the parameter or syntax element pic_init_qp_minus26, sometimes also referred to as init_qp_minus26. A further alternative is to have the parameter SliceQP as the initial QP value.

A further example of a hierarchical coding structure is a so-called hierarchical picture quality coding structure. In this example, pictures of the video sequence are encoded at different picture qualities. Generally, pictures that lay higher up in the hierarchy are coded with lower quality. The pictures of the video sequence could thereby be regarded as being divided or organized into different groups with regard to picture quality.

Hence, in these embodiments the hierarchical coding structure is a hierarchical picture quality coding structure. The multiple pictures have a respective picture quality dependent on picture position in a group of pictures in the hierarchical picture quality coding structure. Step S1 of FIG. 4 then comprises, in an example embodiment, determining, for the picture of the video sequence, the value of the deblocking parameter based on an initial QP value of the picture in the hierarchical picture quality coding structure.

The adjustment of picture quality of pictures can be done by using higher value of initial QP. Hence, pictures with higher initial QP generally have lower picture quality as compared to pictures with lower initial QP. Alternatively, or in addition, adjustment of the picture quality can be performed using adjustment of the parameter lambda, i.e. the Lagrange multiplier $\lambda$, used in the rate-distortion optimization. Thus, using higher values of Lagrange multiplier $\lambda$ for the pictures with greater depth in the coding hierarchy can further reduce the quality of these pictures.

Step S1 of FIG. 4 therefore comprise, in another example embodiment, determining, for the picture of the video sequence, the value of the deblocking parameter based on a lambda parameter value, i.e. a value of Lagrange multiplier $\lambda$, of the picture in the hierarchical picture quality coding structure.

In these example embodiments, there is a one-to-one relationship between initial QP value or the lambda parameter value, i.e. the value of Lagrange multiplier $\lambda$, of a picture and a depth of that picture in the hierarchical picture quality structure coding structure. Generally, hierarchical picture coding uses higher values of initial QP and/or higher values of the lambda parameter value, i.e. the value of Lagrange multiplier $\lambda$, for coding pictures that are higher in the coding hierarchy.

In a particular embodiment, step S1 of FIG. 4 optionally but preferably comprises determining the value of the deblocking parameter to be higher for a picture having a higher, i.e. deeper or larger, depth in the hierarchical coding structure as compared to another picture having a lower, i.e. shallower or smaller, depth in the hierarchical coding structure. This means that pictures with higher initial QP value, higher lambda parameter value (higher value of Lagrange multiplier $\lambda$), higher depth in the coding hierarchy and/or higher layer number preferably will have a higher deblocking parameter value as compared to pictures with comparatively lower initial QP value, lower lambda parameter value (lower value of Lagrange multiplier $\lambda$), lower depth in the coding hierarchy and/or lower layer number.

In another particular embodiment, pictures having higher depth in the hierarchical coding structure preferably have deblocking parameter values that are higher or equal to the deblocking parameter values of pictures with lower depth in the hierarchical coding structure. In a preferred implementation example of this embodiment, not all pictures in the hierarchical coding structure have the same value of the deblocking parameter.

Hence, in this particular embodiment step S1 optionally but preferably comprises determining the value of the deblocking parameter to be equal to or higher for a picture having a higher depth in the hierarchical coding structure as compared to another picture having a lower depth in the hierarchical coding structure so that not all pictures in the hierarchical coding structure have a same value of the deblocking parameter.

In an embodiment, the pictures of the video sequence are associated with not only one deblocking parameter but rather a first deblocking parameter and a second deblocking parameter. FIGS. 5 and 6 are flow diagrams illustrating different optional embodiments of step S1 in FIG. 4 using the first and second deblocking parameters.

Step S10 of FIG. 5 comprises determining, for the picture of the video sequence, a value of the first deblocking parameter based on the depth of the picture in the hierarchical coding structure. Step S11 comprises determining, for the picture, a value of the second deblocking parameter to be equal to a defined value independent of the depth of the picture in the hierarchical coding structure.

Step S20 of FIG. 6 is basically the same as step S10 of FIG. 5 and comprises determining, for the picture of the video sequence, the value of the first deblocking parameter based on the depth of the picture in the hierarchical coding structure. However, step S21 differs from step S11 and comprises determining, for the picture, the value of the second deblocking parameter based on the depth of the picture in the hierarchical coding structure.

Hence, the embodiment as shown in FIG. 5 uses two deblocking parameters for the picture where one of them, i.e. the first deblocking parameter, is determined based on the depth of the picture in the hierarchical coding structure. However, the other, i.e. second, deblocking parameter is not determined based on the depth of the picture but is rather equal to a defined value independent of the depth. The second deblocking parameter could, for instance, be determined according to prior art techniques for the parameters tc_offset_div2 and/or beta_offset_div2. For instance, the second deblocking parameter could be set to zero (by default) or to some constant value for the particular sequence, such as depending on the content of the pictures and/or selected subjective characteristics.

The embodiment as shown in FIG. 6 instead uses the depth of the picture to determine both the first deblocking parameter value and the second deblocking parameter value.

Figure 3:
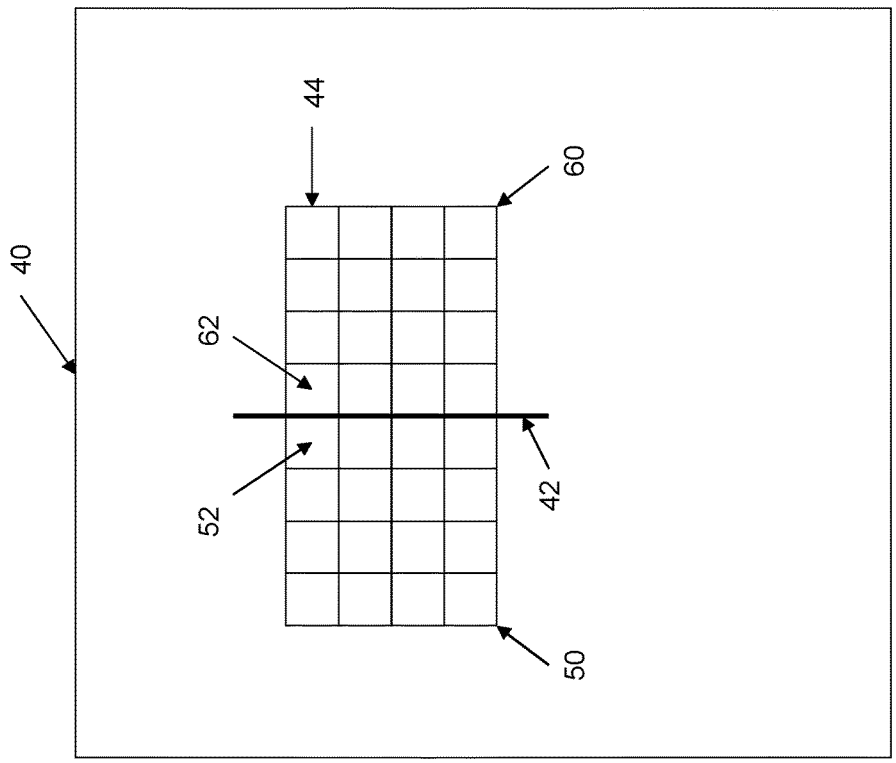
FIG. 3 is a schematic illustration of a picture of a video sequence.

In an embodiment, the deblocking parameter, the value of which is determined in step S1 of FIG. 4 (or indeed in step S10 of FIG. 5 or step S20 or S21 of FIG. 6), is optionally but preferably used to define a value of a threshold parameter used to determine whether to apply deblocking filtering to a block 50, see FIG. 3, of pixels 52 in the picture 40. Alternatively, or in addition, the deblocking parameter is, optionally but preferably, used to define a value of a threshold parameter used to determine whether to apply strong deblocking filtering or weak deblocking filtering to a line 44 of pixels 52, 62 in the block 50 of pixels.

In an implementation example applicable to HEVC, the threshold parameter used to determine whether to apply deblocking filtering to a block of pixels in a picture is β, see equation (3) in the background section. Hence, in this embodiment β=function(deblocking parameter) and where the value of the deblocking parameter is determined based on the depth of the picture and function( ) indicates that the threshold parameter β is determined at least partly based on the deblocking parameter.

In a particular embodiment, the threshold parameter $\beta=\beta'\times(1<<(BitDepth-8))$, where β' is obtained from Table 1 using Q as table input. This parameter Q is in turn preferably defined as Q=Clip3(0, 51, qP+(beta_offset_div2<<1)). Hence, in this particular embodiment the deblocking parameter is preferably the variable beta_offset_div2. This means that the deblocking parameter (beta_offset_div2) defines the threshold parameter β, preferably together with an average quantization parameter qP and the bit depth parameter BitDepth.

In an implementation example applicable to HEVC, the threshold parameter used to determine whether to apply strong deblocking filtering or weak deblocking filtering to a line of pixels in a block of pixels in a picture is β and/or $t_C$, see equations (4)-(6) in the background section. Thus, these equations use thresholds $\beta>>2$ (equation (4)), $\beta>>3$ (equation (5)) and $(5*t_C+1)>>1$ (equation (6)) to determine whether to apply strong deblocking filtering or weak deblocking filtering.

Hence, in an embodiment the deblocking parameter is used to define the value of the threshold parameter β. This is basically performed as discussed in the foregoing for the threshold parameter used to determine whether to apply deblocking filtering to a block of pixels or not.

In another embodiment, the deblocking parameter is used to define the value of the threshold parameter $t_C$. Hence, in this embodiment $t_C$=function(deblocking parameter) and where the value of the deblocking parameter is determined based on the depth of the picture and function( ) indicates that the threshold parameter $t_C$ is determined at least partly based on the deblocking parameter.

In a particular embodiment, the threshold parameter $tc=tc'\times(1<<(BitDepth-8))$, where $t_C'$ is obtained from Table 1 using Q as table input. This parameter Q is in turn preferably defined as Q=Clip3(0, 53, qP+2×(bS−1)+(tc_offset_div2<<1)). Hence, in this particular embodiment the deblocking parameter is preferably the variable tc_offset_div2. This means that the deblocking parameter (tc_offset_div2) defines the threshold parameter $t_C$, preferably together with an average quantization parameter qP and the boundary strength bS.

In another embodiment, the deblocking parameter, the value of which is determined in step S1 of FIG. 4 (or indeed in step S10 of FIG. 5 or step S20 or S21 of FIG. 6), is optionally but preferably used to define a value of a clipping threshold parameter used to define pixel value limits for pixel values filtered according to weak deblocking filtering or strong deblocking filtering.

In an implementation example applicable to HEVC, the clipping threshold parameter is $t_C$, see sections discussing weak filtering and strong filtering in the background section. Thus, weak filtering uses clipping thresholds $t_C$ and $t_C>>1$, whereas strong filtering uses clipping thresholds $pN-2\times t_C$ and $qN-2\times t_C$, wherein N=0, 1, 2 and pN denotes pixel value of a pixel 52, also denoted sample in the art, in a line 44 of pixels 52, 62 in a current block 50 of pixels 52 and qN denotes pixel value of a pixel 62 in the line 44 of pixels 52, 62 in a neighboring block 60 of pixels 62. The block 50 of pixels 52 and the neighboring block 60 of pixels 60 are separated from each other in the picture 40 by a horizontal or, as shown in FIG. 3, a vertical block boundary 42.

Hence, in an embodiment the deblocking parameter is used to define the value of the clipping threshold parameter $t_C$. This is basically performed as discussed in the foregoing for the threshold parameter $t_C$ used to determine whether to apply strong or weak deblocking filtering.

Hence, in an embodiment step S1 of FIG. 4 preferably comprises determining, for the picture of the video sequence, a value of tc_offset_div2 based on the depth of the picture in the hierarchical coding structure. In another embodiment step S1 preferably comprises determining, for the picture of the video sequence, a value of beta_offset_div2 based on the depth of the picture in the hierarchical coding structure.

In the flow diagram of FIG. 5, step S10 could comprise determining, for the picture of the video sequence, a value of beta_offset_div2 based on the depth of the picture in the hierarchical coding structure, whereas step S11 then comprises determining, for the picture, a value of tc_offset_div2 to be equal to a defined value independent of the depth.

In an alternative approach, step S10 could comprise determining, for the picture of the video sequence, a value of tc_offset_div2 based on the depth of the picture in the hierarchical coding structure, whereas step S11 then comprises determining, for the picture, a value of beta_offset_div2 to be equal to a defined value independent of the depth.

In the flow diagram of FIG. 6, step S20 could comprise determining, for the picture of the video sequence, a value of beta_offset_div2 based on the depth of the picture in the hierarchical coding structure, and step S21 then comprises determining, for the picture, a value of tc_offset_div2 based on the depth of the picture in the hierarchical coding structure.

In a particular embodiment, the encoder has access to a predefined list or table of values for the deblocking parameter suitable for various depths and/or depth levels of pictures in the hierarchical coding structure. In such a case, the determination of the value of the deblocking parameter in step S1 of FIG. 4, step S10 of FIG. 5 of steps 20 and 21 of FIG. 6 preferably comprises identifying, from the list or table, which value to use for the current picture based on the depth or depth level of the picture in the hierarchical coding structure.

Instead of having a list or table of values, the encoder can have access to a function that outputs a suitable value of the deblocking parameter using the depth or depth level of the picture as input.

The encoding of the value of the deblocking parameter in step S2 is preferably performed by generating a syntax element specifying the value of the deblocking parameter.

An example of such a syntax element is beta_offset_div2 encoded with the signed integer 0-th order Exp-Golomb-code code. Another example is a syntax element of tc_offset_div2 also encoded in with the signed integer 0-th order Exp-Golomb-code code.

The syntax element could be inserted into a slice header of the picture. Alternatively, or in addition, the syntax element could be inserted into a parameter set associated with the picture.

Generally, when an encoder encodes pictures of a video sequence the encoder divides a picture into one or multiple, i.e. at least two, slices. A slice is an independently encodable and decodable portion of the picture. The encoder encodes the slice to get a slice header and encoded slice data, i.e. video payload, together forming an encoded representation of the slice. This encoded representation is typically output from the encoding process as a so called Network Adaptation Layer (NAL) unit. A NAL unit may, alternatively, carry parameter set data providing control data applicable to all slices of a picture, to all pictures within a sequence or indeed to a complete video sequence. Examples of such parameter sets include Picture Parameter Set (PPS), Sequence Parameter Set (SPS) and Video Parameter Set (VPS). In such a case, the slice header comprises information allowing identification of the parameter set that is associated with the slice and comprises control data applicable to the slice. For instance, a slice header can comprise a PPS identifier identifying a PPS. The PPS may in turn comprise an SPS identifier allowing identification of an SPS, which may comprise a VPS identifier identifying a VPS.

FIGS. 8 and 11 schematically illustrate this concept showing a bitstream with encoded representations 2 of slices and pictures, such as in the form of NAL units. The encoded representation 2 comprises a slice header 3 with a PPS identifier 4 and video payload data 5.

In an embodiment, the above mentioned syntax element could be inserted into the slice header of the picture. If the picture comprises multiple slices the syntax element is preferably inserted into each slice header of the multiple slices. Alternatively, it could be sufficient to only include the syntax element in the slice header of the first slice of the picture.

In this embodiment, the syntax element(s) could be denoted slice_beta_offset_div2 and slice_tc_offset_div2 to indicate that the deblocking parameter(s) is(are) present in the slice header.

In an alternative embodiment, the syntax element could be inserted into a parameter set associated with and applicable to the picture, or more correctly to the slice(s) of the picture. The parameter set could be a PPS, an SPS or a VPS. In the former case, the slice header(s) of the picture comprise(s) a respective PPS identifier identifying the PPS comprising the syntax element. In the latter cases, the slice header(s) of the picture comprise(s) a respective PPS identifier identifying a PPS comprising an SPS identifier allowing identification of the SPS comprising the syntax element or comprising an SPS identifier allowing identification of an SPS, which in turn comprises a VPS identifier allowing identification of the VPS comprising the syntax element.

In these embodiments, the syntax element(s) could be denoted pps_beta_offset_div2 and pps_tc_offset_div2 to indicate that the deblocking parameter(s) is(are) present in a PPS.

This means that step S3 of FIG. 4 preferably comprises sending the encoded value of the deblocking parameter in a slice header or in a parameter set, preferably a PPS, to the decoder.

In an embodiment, encoder control is proposed in order to reduce the artifacts visibility in hierarchical QP coding. It is proposed to send the offsets to the deblocking parameters for the pictures/slices with higher depth as in the following. The pictures/slices that have higher initial picture QP/slice QP values use the deblocking parameters offsets whose values are greater or equal to the deblocking parameters values of the pictures/slices that are lower in the coding hierarchy. Some (not all) levels in the QP hierarchy may have the same value of deblocking parameters offsets.

In accordance with the described embodiments a threshold parameter used for deblocking is adjusted. The threshold parameter takes into account the depth which is determined by the value of the initial QP. The threshold parameter is exemplified by tc_offset_div2.

According to an aspect of the embodiments, a method performed by an encoder is provided. In the method, the threshold parameter is encoded and sent to the decoder. The encoder sets the threshold parameter based on the depth. The threshold parameter can be sent in a PPS or in a slice header.

Thus, it is proposed to use larger offsets that are used in derivation of deblocking parameters for the pictures/slices that have higher QP values. One or more values of deblocking parameters offsets can be changed when moving to the next level of QP. One alternative is that one offset takes higher values at the next initial QP level, or a level which are higher up in the coding hierarchy, while another offset either takes the same values for all hierarchy levels.

Another alternative is that both (or all) deblocking parameters for sent for the picture/slices at the higher levels of hierarchy take greater or equal values to the deblocking parameters offsets that take lower levels of the hierarchy.

The deblocking parameters can also increase their values interchangeable, one at a time with moving to the next QP level.

Some depth layers with different values of the initial picture QP, may have the same value of one or more (or all) deblocking parameters.

The deblocking parameters can be signaled with using the existing means of the standard. For example, in HEVC, the deblocking parameters tc_offset_div2 and/or beta_offset_div2 are used to further increase the relative deblocking strength at the higher levels of the depth and/or coding hierarchy.

Herebelow various example embodiments will be further described.

Example Embodiment 1

Four depth layers are used, and the parameter tc_offset_div2 is signaled by the encoder to the decoder. The parameter tc_offset_div2 takes the following values depending on the depth of the picture in the hierarchy. The depth is determined by the value of the initial quantization parameter (QP), i.e. higher values of QP mean higher depth, and/or possibly the coding structure.
Depth 0 (QP0): tc_offset_div2=0
Depth 1 (QP1): tc_offset_div2=2
Depth 2 (QP2): tc_offset_div2=3
Depth 3 (QP3): tc_offset_div2=4

The deblocking parameters can be sent in either the picture parameter sets (PPS) or in the slice header of the slices corresponding to pictures.

Example Embodiment 2

Four depth layers are used and the parameter tc_offset_div2 is signaled by the encoder to the decoder. It takes the following values depending on the depth of the picture in the hierarchy. The depth is determined by the value of the initial quantization parameter (QP), i.e. higher values of QP mean higher depth, and/or possibly the coding structure.
Depth 0 (QP0): tc_offset_div2=0
Depth 1 (QP1): tc_offset_div2=2
Depth 2 (QP2): tc_offset_div2=2
Depth 3 (QP3): tc_offset_div2=5

The deblocking parameters can be sent in either the picture parameter sets (PPS) or in the slice header of the slices corresponding to pictures.

Example Embodiment 3

Four depth layers are used. The parameter tc_offset_div2 is signaled by the encoder to the decoder and takes the following values depending on the depth of the picture in the hierarchy. The value of parameter beta_offset_div2 is the same for all levels of hierarchy. The depth is determined by the value of the initial picture quantization parameter (QP), i.e. higher values of QP correspond to higher depth, and possibly the coding structure.
Depth 0 (QP0): tc_offset_div2=0
  beta_offset_div2=0
Depth 1 (QP1): tc_offset_div2=2
  beta_offset_div2=0
Depth 2 (QP2): tc_offset_div2=3
  beta_offset_div2=0
Depth 3 (QP3): tc_offset_div2=4
  beta_offset_div2=0

The deblocking parameters can be sent in either the picture parameter sets (PPS) or in the slice header of the slices corresponding to pictures.

Example Embodiment 4

Four depth layers are used and the parameters tc_offset_div2 and beta_offset_div2 is signaled by the encoder to the decoder and take the following values depending on the depth of the picture in the hierarchy. The depth is determined by the value of the initial quantization parameter (QP), i.e. higher values of QP mean higher depth, and possibly the coding structure.
Depth 0: tc_offset_div2=0
  beta_offset_div2=1
Depth 1: tc_offset_div2=2
  beta_offset_div2=1
Depth 2: tc_offset_div2=3
  beta_offset_div2=2
Depth 3: tc_offset_div2=4
  beta_offset_div2=2

The deblocking parameters can be sent in either the picture parameter sets (PPS) or in the slice header of the slices corresponding to pictures.

Example Embodiment 5

Four depth layers are used and the parameters tc_offset_div2 and beta_offset_div2 are signaled by the encoder to the decoder and take the following values depending on the depth of the picture in the hierarchy. The depth is determined by the value of the initial quantization parameter (QP), i.e. higher values of QP mean higher depth, and possibly the coding structure.
Depth 0: tc_offset_div2=0
  beta_offset_div2=0
Depth 1: tc_offset_div2=3
  beta_offset_div2=0
Depth 2: tc_offset_div2=5
  beta_offset_div2=2
Depth 3: tc_offset_div2=6
  beta_offset_div2=2

The deblocking parameters can be sent in either the picture parameter sets (PPS) or in the slice header of the slices corresponding to pictures.

Example Embodiment 6

Four depth layers are used and the parameters tc_offset_div2 and beta_offset_div2 are signaled by the encoder to the decoder and take the following values depending on the depth of the picture in the hierarchy. The depth is determined by the value of the initial quantization parameter (QP), i.e. higher values of QP mean higher depth, and possibly the coding structure.
Depth 0: tc_offset_div2=0
  beta_offset_div2=0
Depth 1: tc_offset_div2=3
  beta_offset_div2=0
Depth 2: tc_offset_div2=3
  beta_offset_div2=2
Depth 3: tc_offset_div2=4
  beta_offset_div2=3

The deblocking parameters can be sent in either the picture parameter sets (PPS) or in the slice header of the slices corresponding to pictures.

Example Embodiment 7

Four depth layers are used and the parameter beta_offset_div2 is signaled by the encoder to the decoder and take the following values depending on the depth of the picture in the hierarchy. The depth is determined by the value of the initial quantization parameter (QP), i.e. higher values of QP correspond to higher depth, and possibly the coding structure.

Depth 0 (QP0): beta_offset_div2=0
  tc_offset_div2=0
Depth 1 (QP1): beta_offset_div2=2
  tc_offset_div2=0
Depth 2 (QP2): beta_offset_div2=3
  tc_offset_div2=0
Depth 3 (QP3): beta_offset_div2=4
  tc_offset_div2=0

The deblocking parameters can be sent in either the picture parameter sets (PPS) or in the slice header of the slices corresponding to pictures.

Example Embodiment 8

Three depth layers are used and the parameter tc_offset_div2 is signaled by the encoder to the decoder. It takes the following values depending on the depth of the picture in the hierarchy. The depth is determined by the value of the QP offset, i.e. higher values of QP offset mean higher depth. The value of parameter beta_offset_div2 is the same for all levels of hierarchy.

Depth 0 (QP offset 1): tc_offset_div2=1
  beta_offset_div2=0
Depth 1 (QP offset 2): tc_offset_div2=3
  beta_offset_div2=0
Depth 2 (QP offset 3): tc_offset_div2=5
  beta_offset_div2=0

The deblocking parameters can be sent in either the picture parameter sets (PPS) or in the slice header of the slices corresponding to pictures.

Example Embodiment 9

Four depth layers are used and the parameter tc_offset_div2 is signaled by the encoder to the decoder. It takes the following values depending on the depth of the picture in the hierarchy. The depth is determined by the value of the QP offset, i.e. higher values of QP offset mean higher depth. The value of parameter beta_offset_div2 is the same for all levels of hierarchy.

Depth 0 (QP offset 1): tc_offset_div2=1
  beta_offset_div2=0
Depth 1 (QP offset 2): tc_offset_div2=3
  beta_offset_div2=0
Depth 2 (QP offset 3): tc_offset_div2=4
  beta_offset_div2=0
Depth 3 (QP offset 4): tc_offset_div2=6
  beta_offset_div2=0

The deblocking parameters can be sent in either the picture parameter sets (PPS) or in the slice header of the slices corresponding to pictures.

Example Embodiment 10

Four depth layers are used and the parameters tc_offset_div2 and beta_offset_div2 are signaled by the encoder to the decoder. It takes the following values depending on the depth of the picture in the hierarchy.

Depth 0: tc_offset_div2=1
  beta_offset_div2=0
Depth 1: tc_offset_div2=3
  beta_offset_div2=0
Depth 2: tc_offset_div2=4
  beta_offset_div2=1
Depth 3: tc_offset_div2=6
  beta_offset_div2=2

The deblocking parameters can be sent in either the picture parameter sets (PPS) or in the slice header of the slices corresponding to pictures.

The example embodiments provided above are approximate. Implementations of the proposed parameters may use different numbers of depth layers, including different initial picture/slice QP values, and/or different values of QP offsets. The values of beta_offset_div2 and tc_offset_div2 may also depend on the level of QP values and also be derived from the parameter lambda used in the rate distortion optimization.

According to an aspect of the embodiments, a method performed by a decoder is provided. In the method, the threshold parameter is received and decoded and the deblocking filter of the decoder uses this parameter for the deblocking. The threshold parameter can be received in a PPS or in a slice header.

FIG. 7 is a flow diagram illustrating a method performed by a decoder for a video sequence comprising multiple pictures having a respective depth in a hierarchical coding structure. The method comprises receiving, in step S30, an encoded value of a deblocking parameter. A next step S31 comprises decoding the encoded value to form a value of the deblocking parameter. The following step S32 comprises determining, for a picture of the video sequence, a value of a threshold parameter based on the value of the deblocking parameter. According to this aspect, the value of the deblocking parameter is determined based on a depth of the picture in the hierarchical coding structure.

This means that different pictures having different depths in the hierarchical coding structure preferably have different values of the deblocking parameter.

In an embodiment, step S30 comprises receiving the encoded value as a part of a slice header in an encoded representation of a slice of the picture. Alternatively, the encoded value could be received in step S30 as a part of a parameter set, such as PPS, applicable to the current picture.

The decoding of the encoded value in step S31 then preferably comprises parsing the slice header and identifying and decoding the syntax element representing the deblocking parameter to get the value. Alternatively, the parameter set is identified based on a parameter set identifier present in the slice header and the syntax element present in the parameter set is parsed and decoded to get the value.

The threshold parameter, the value of which is determined in step S32, is, in an embodiment, a threshold used to determine whether to apply deblocking filtering to a block of pixels in the picture. Hence, in this embodiment the threshold parameter is β as previously disclosed herein.

Alternatively, or in addition, the threshold parameter, the value of which is determined in step S32, is used to determine whether to apply strong deblocking filtering or weak deblocking filtering to a line of pixels in a block of pixels. Hence, in this embodiment the threshold parameter is β or $t_C$ as previously disclosed herein.

In a further alternative, the threshold parameter is a clipping threshold parameter $t_C$ that is used to determine pixel value limits for pixel values filtered according to weak deblocking filtering or strong deblocking filtering as previously disclosed herein.

An advantage with at least one of the embodiments is that the subjective and/or the objective quality of encoded video is improved.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The processor is capable of executing software instructions contained in a computer program stored in a computer program product e.g. in the form of the memories. The respective computer program product can be a memory being any combination of read and write memory (RAM) and read only memory (ROM). The respective memory comprises persistent storage, which, for example, can be any single one or combination of magnetic memory, optical memory, solid state memory or even remotely mounted memory.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the embodiments, an encoder is provided. The encoder is configured to set the threshold parameter, i.e. deblocking parameter, based on the depth to encode the threshold parameter, i.e. the deblcoking parameter, and to send the threshold parameter, i.e. the deblocking parameter.

Hence, an aspect of the embodiments relates to an encoder. The encoder is operable to determine, for a picture of a video sequence comprising multiple pictures having a respective depth value in a hierarchical coding structure, a value of a deblocking parameter based on a depth of the picture in the hierarchical coding structure. The encoder is also operable to encode the value of the deblocking parameter to form an encoded value of the deblocking parameter. The encoder is further operable to send the encoded value to a decoder.

The encoder 100 comprises, in an embodiment, a processor 110 configured to perform the method steps previously disclosed herein, see FIG. 8. The encoder 100 may also comprise a memory 120 connected to the processor 110.

Hence, in an implementation example the encoder 100 comprises a processor 110 and a memory 120. The processor 110 is then operable, or configured or adapted, to determine, for the picture, the value of the deblocking parameter based on the depth of the picture in the hierarchical coding structure. The processor 110 is also operable to encode the value of the deblocking parameter to form the encoded value of the deblocking parameter. The processor 110 is further operable to send the encoded value to the decoder.

In FIG. 8, the encoder 100 has been illustrated as comprising a processor 110. This processor 110 could be implemented as a single processor or multiple processors, such as in the form of a processing circuitry.

FIG. 8 thereby illustrates a computer implementation of the encoder 100. In this particular example, at least some of the steps, functions, procedures, modules and/or blocks described above are implemented in a computer program, which is loaded into the memory 120 for execution by the processor 110. The processor 110 and memory 120 are interconnected to each other to enable normal software execution. An optional input/output device (not shown) may also be interconnected to the processor 110 and/or the memory 120 to enable input and/or output of relevant data.

The term 'computer' should be interpreted in a general sense as any system or device capable of executing program code or computer program instructions to perform a particular processing, determining or computing task.

In an embodiment, the hierarchical coding structure is a hierarchical QP coding structure. Hence, the multiple pictures have a respective initial QP value in the hierarchical QP coding structure. The processor 110 is then operable to determine, for the picture of the video sequence, the value of the deblocking parameter based on an initial QP value of the picture in the hierarchical QP coding structure.

In an embodiment, the video sequence is a multi-layer video sequence comprising multiple layers having different depths in the hierarchical coding structure. The processor 110 is then operable to determine, for the picture of the multi-layer video sequence, the value of the deblocking parameter based on a depth of a layer, to which the picture belongs, of the multiple layers in the hierarchical coding structure.

In an embodiment, the hierarchical coding structure is a hierarchical picture quality coding structure. The multiple pictures have a respective picture quality dependent on picture position in a group of pictures in the hierarchical picture quality coding structure. The processor 110 is then operable to determine, for the picture of the video sequence, the value of the deblocking parameter based on an initial QP value or of a parameter lambda (Lagrange multiplier λ) of the picture in the hierarchical picture quality coding structure.

The processor 110 is, in a particular embodiment, preferably operable to determine the value of the deblocking parameter to be higher for a picture having a higher depth in the hierarchical coding structure as compared to another picture having a lower depth in the hierarchical coding structure.

Alternatively, the processor 110 is operable, in another particular embodiment, to determine the value of the deblocking parameter to be equal to or higher for a picture having a higher depth in the hierarchical coding structure as compared to another picture having a lower depth in the hierarchical coding structure so that not all pictures in the hierarchical coding structure have a same value of the deblocking parameter.

If the picture is associated with a first deblocking parameter and a second deblocking parameter as previously described the processor 110 is optionally operable to determine, for the picture, a value of the first deblocking parameter based on the depth of the picture in the hierarchical coding structure. The processor 110 is also operable to determine, for the picture, a value of the second deblocking parameter to be equal to a defined value independent of the depth, such as zero. Alternatively, the processor 110 is operable to determine, for the picture, the value of the second deblocking parameter based on the depth of the picture in the hierarchical coding structure.

In an embodiment, the processor 110 is operable to determine, for the picture, a value of at least one of tc_offset_div2, slice_tc_offset_div2 and pps_tc_offset_div2 based on the depth of the picture in the hierarchical coding structure. In another embodiment, the processor 110 is operable to determine, for the picture, a value of at least one of beta_offset_div2, slice_beta_offset_div2 and pps_beta_offset_div2 based on the depth of the picture in the hierarchical coding structure. In a further embodiment, the processor 110 is operable to determine, for the picture, a value of at least one of tc_offset_div2, slice_tc_offset_div2 and pps_tc_offset_div2 and a value of at least one of beta_offset_div2, slice_beta_offset_div2 and pps_beta_offset_div2 based on the depth of the picture in the hierarchical coding structure.

The processor 110 is preferably also operable to send the encoded value to the decoder such as part of a slice header or as part of a parameter such, preferably a PPS. The processor 110 is then preferably operable to forward a NAL unit comprising the slice header or the PPS to an output unit (not shown) that sends the NAL unit with the encoded value of the deblocking parameter to the decoder.

FIG. 9 is a schematic block diagram of another implementation example of the encoder 200. This example is in particular suitable for a hardware implementation of the encoder 200. The encoder 200 then comprises a value determining unit 210 operable to determine, for the picture of the video sequence, the value of the deblocking parameter based on the depth of the picture in the hierarchical coding structure. The encoder 200 also comprises a value encoder 220 connected to the value determining unit 210. This value encoder 220 is operable to encode the value of the deblocking parameter to form the encoded value of the deblocking parameter. An output unit 230 is preferably connected to the value encoder 220 and operable to send the encoded value of the deblocking parameter to the decoder.

In an embodiment, the value determining unit 210 outputs the determined deblocking parameter that is input to the value encoder 220. The value encoder 220 in turn outputs the encoded value of the deblocking parameter that is input to the output unit 230.

As indicated in the foregoing, the encoder may alternatively be defined as a group of function modules, where the function modules are implemented as a computer program running on a processor.

FIG. 8 is a schematic block diagram illustrating an example of an encoder 100 comprising a processor 110 and an associated memory 120.

Figures 10, 12:
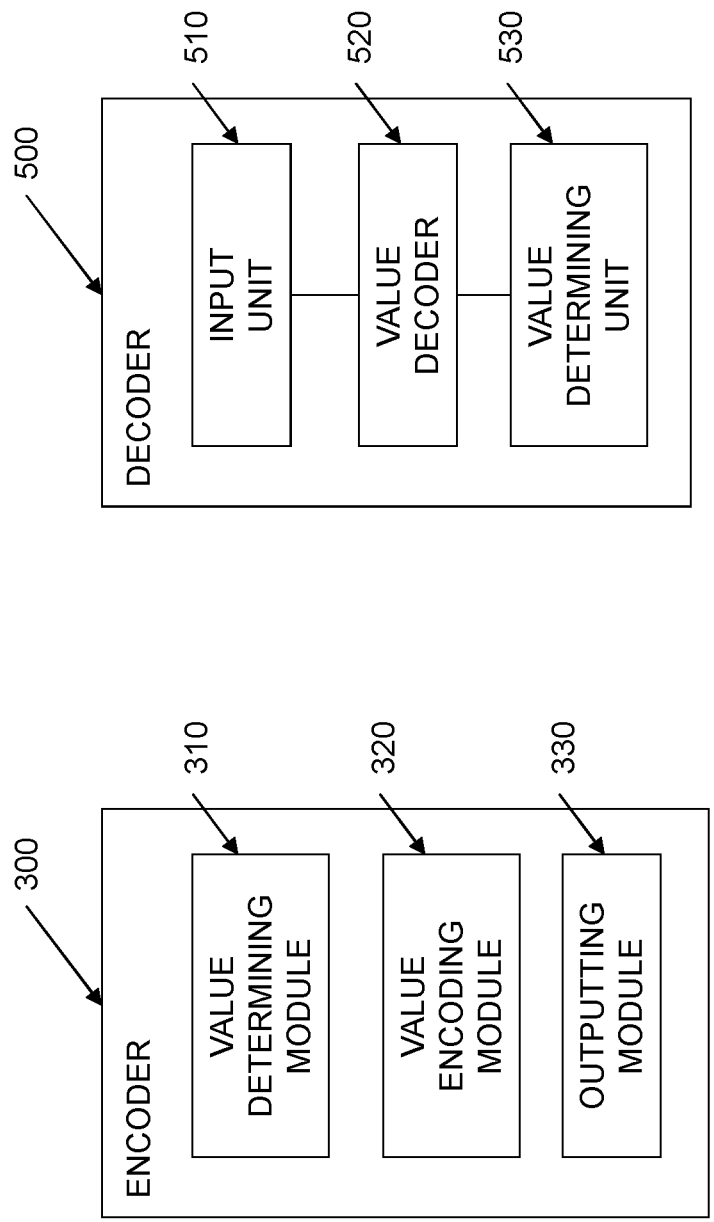
FIG. 10 is a schematic block diagram of an encoder according to a further embodiment.
FIG. 12 is a schematic block diagram of a decoder according to another embodiment.

The computer program residing in memory 120 may thus be organized as appropriate function modules configured to perform, when executed by the processor 110, at least part of the steps and/or tasks described above. An example of such function modules is illustrated in FIG. 10. FIG. 10 is thereby a schematic block diagram illustrating an example of an encoder 300 comprising a group of function modules 310, 320, 330. These modules comprise a value determining module 310 for determining, for a picture of a video sequence comprising multiple pictures having a respective depth in a hierarchical coding structure, a value of a deblocking parameter based on a depth of the picture in the hierarchical coding structure. The encoder 300 also comprises a value encoding module 320 for encoding the value of the deblocking parameter to form an encoded value of the deblocking parameter. The encoder 300 further comprises an outputting module 330 for sending the encoded value to a decoder.

In an embodiment, the value determining module 310 outputs the determined deblocking parameter that is input to the value encoding module 320. The value encoding module 320 in turn outputs the encoded value of the deblocking parameter that is input to the outputting module 330.

In the following, an example of a computer implementation will be described with reference to FIG. 14. The computer 70 comprises a processor 72 and a memory represented by a computer program product 73 in the figure. The processor 72 and computer program product 73 are interconnected to each other to enable normal software execution. An optional input/output (I/O) unit 71 may also be interconnected to the processor 72.

In a particular embodiment, a computer program 74 comprises program code which when executed by the processor 72 or computer 70 causes the processor 72 or computer 70 to determine, for a picture of a video sequence comprising multiple pictures having a respective depth in a hierarchical coding structure, a value of a deblocking parameter based on a depth of the picture in the hierarchical coding structure. The processor 72 or computer 70 is also caused to encode the value of the deblocking parameter to form an encoded value of the deblocking parameter and to send the encoded value to a decoder The software or computer program 74 may be realized as a computer program product 73, which is normally carried or stored on a computer-readable medium. The computer-readable medium may include one or more removable or non-removable memory devices including, but not limited to a ROM, a RAM, a Compact Disc (CD), a Digital Versatile Disc (DVD), a Universal Serial Bus (USB), memory, a Hard Disk Drive (HDD) storage device, a flash memory, or any other conventional memory device. The computer program 74 may thus be loaded into the operating memory of a computer 70 or equivalent processing device for execution by the processor 72 thereof.

The computer 70 or processor 72 does not have to be dedicated to only execute the above-described steps, functions, procedure and/or blocks, but may also execute other tasks.

According to an aspect of the embodiments, a decoder is provided. The decoder is configured to receive a threshold parameter and to decode the threshold parameter. Hence, in an embodiment the decoder is operable to receive an encoded value of a deblocking parameter. The decoder is also operable to decode the encoded value to form a value of the deblocking parameter. The decoder is further operable to determine, for a picture of a video sequence comprising multiple pictures having a respective depth in a hierarchical coding structure, a value of a threshold parameter based on the value of the deblocking parameter. In this aspect, the value of the deblocking parameter is determined based on a depth of the picture in the hierarchical coding structure.

The decoder 400 can be implemented as comprising a processor 410 configured to perform the method steps, see FIG. 11. The decoder 400 may also comprise a memory 420. The processor 410 is then operable to receive the encoded value of the deblocking parameter and decode the encoded value to form the value of the deblocking parameter. The processor 410 is also operable to determine, for the picture of the video sequence, the value of the threshold parameter based on the value of the deblocking parameter.

FIG. 12 is a schematic block diagram of a hardware implementation of the decoder 500. The decoder 500 then comprises an input unit 510 operable to receive the encoded value of the deblocking parameter. A value decoder 520 is connected to the input unit 510 and is operable to decode the encoded value to form the value of the deblocking parameter. The decoder 500 also comprises a value determining unit 530 connected to the value decoder 520. The value determining unit 530 is operable to determine, for the picture of the video sequence, the value of the threshold parameter based on the value of the deblocking parameter.

In an embodiment, the input unit 510 outputs the encoded value that is input to the value decoder 520. The value decoder 520 in turn outputs the value of the deblocking parameter that is input to the value determining unit 530.

FIG. 13 is a schematic block diagram of another implementation example of the decoder 600. The decoder 600 comprises an inputting module 610 for receiving an encoded value of a deblocking parameter. The decoder 600 also comprises a value decoding module 620 for decoding the encoded value to form a value of the deblocking parameter. The decoder 600 additionally comprises a value determining module 630 for determining, for a picture of a video sequence comprising multiple pictures having a respective depth in a hierarchical coding structure, a value a threshold parameter based on the value of the deblocking parameter. This value of the deblocking parameter is determined based on a depth of the picture in the hierarchical coding structure.

In an embodiment, the inputting module 610 outputs the encoded value that is input to the value decoding module 620. The value decoding module 620 in turn outputs the value of the deblocking parameter that is input to the value determining module 630.

Figure 15:
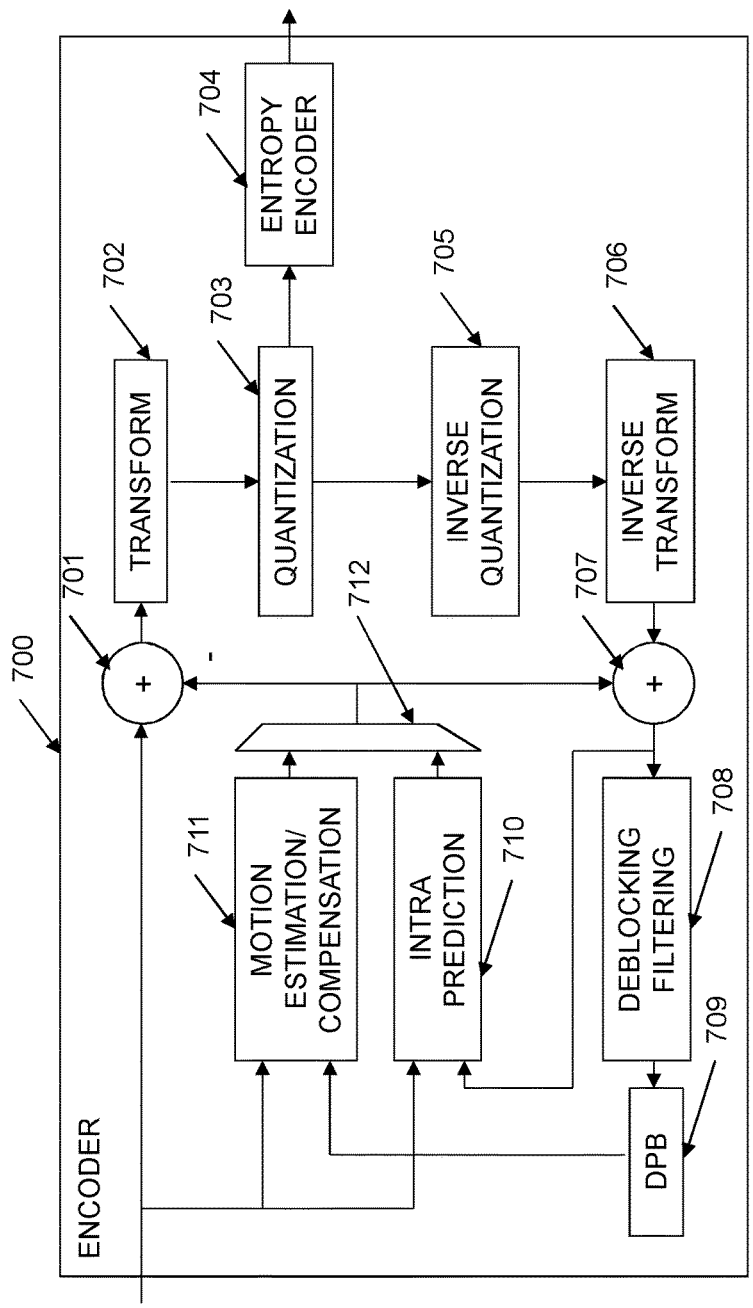
FIG. 15 is a schematic block diagram of an encoder according to yet another embodiment.

FIG. 15 is a schematic block diagram of an encoder 700 for encoding pictures of a video sequence according to an embodiment.

A current block of pixels is predicted by performing a motion estimation 711 from an already provided block of pixels in the same picture or in a previous encoded and decoded picture as obtained from a decoded picture buffer (DPB) 709. The result of the motion estimation is a motion vector associated with the reference block, in the case of inter prediction. The motion vector is utilized in a motion compensation 711 for outputting an inter prediction of the block of pixels.

An intra prediction 710 computes an intra prediction of the current block of pixels. The outputs from the motion estimator/compensation 711 and the intra prediction 710 are input in a selector 712 that either selects the intra prediction or the inter prediction for the current block of pixels. The selector 712 typically selects the prediction that results in the best result in terms of rate-distortion metric: $J=D+\lambda R$, wherein D denotes distortion and represents a deviation of the intra or inter prediction from the original block of pixels. Deviation is typically measured as the mean square error between the pixel values of the intra or inter prediction and the pixel values of the original block of pixels. $\lambda$ is the Lagrange multiplier and R represents the bit cost of representing the block of pixels with the intra or inter prediction.

The output from the selector 712 is input to an error calculator in the form of an adder 701 that also receives the pixel values of the current block of pixels. The adder 41 calculates and outputs a residual error as the difference in pixel values between the block of pixels and its selected prediction.

The error is transformed 702, such as by a discrete cosine transform, and quantized 703 followed by coding in an entropy encoder 704. In inter coding, also the estimated motion vector is brought to the entropy encoder 704 for generating the coded representation of the current block of pixels.

The transformed and quantized residual error for the current block of pixels is also inverse quantized 705 and inverse transformed 706 to retrieve the original residual error. This error is added by an adder 707 to the prediction output from the selector 712 to create a reference block of pixels that can be used in the prediction and coding of a next block of pixels. This new reference block is first subject to deblocking filtering 708 to combat blocking artifacts. The filtered reference block is then temporarily stored in the DPB 709, where it is available to intra prediction 710 and motion estimation/compensation 711 for following blocks of pixels.

The deblocking filtering 708 uses deblocking filtering offsets determined as disclosed herein based on depths of pictures in a hierarchical coding structure.

Figure 16:
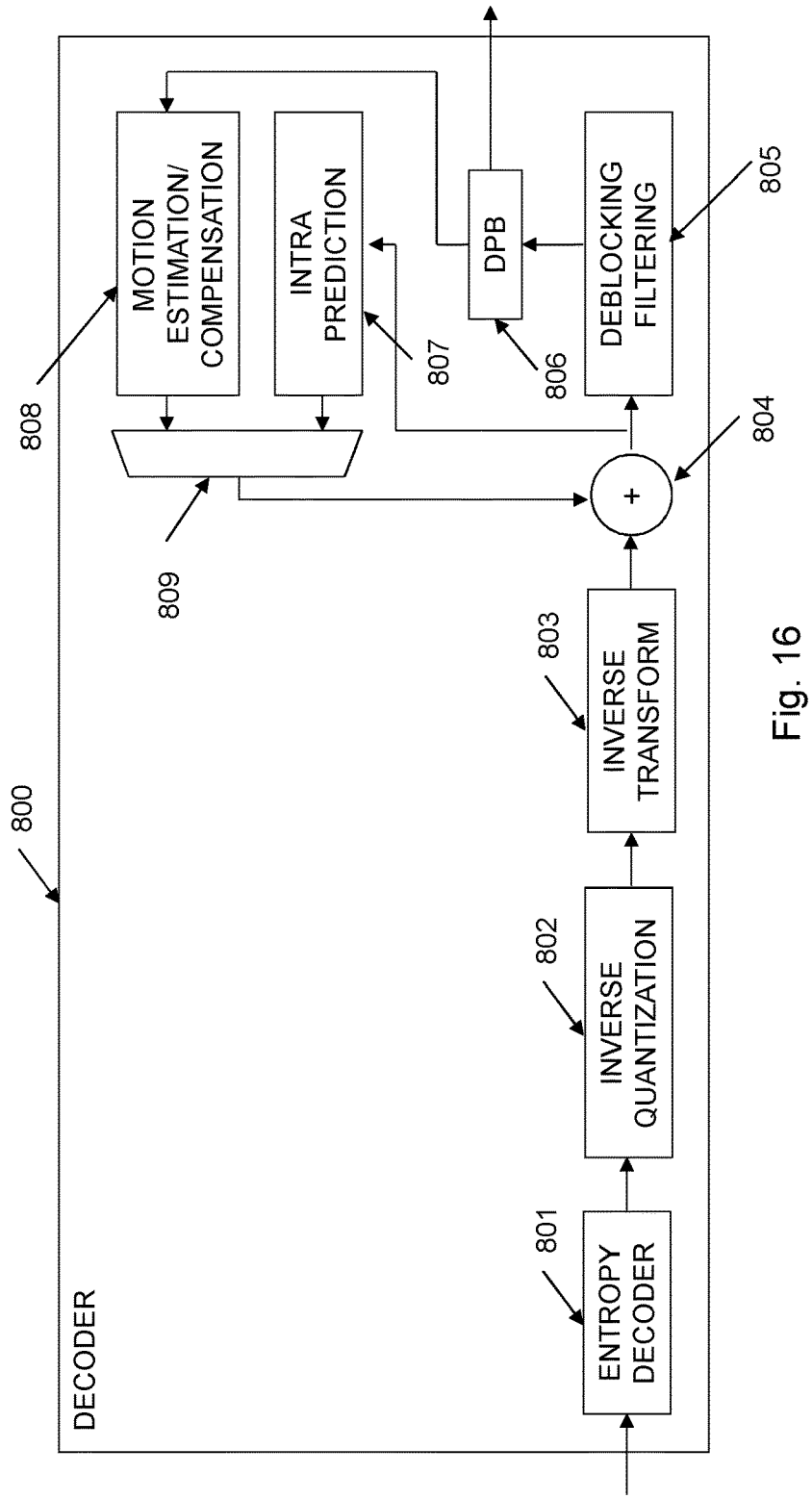
FIG. 16 is a schematic block diagram of a decoder according to yet another embodiment.

FIG. 16 is a corresponding schematic block diagram of a decoder 800. The decoder 800 comprises an entropy decoder 801 for decoding an encoded representation of a block of pixels to get a set of quantized and transformed residual errors. These residual errors are inverse quantized 802 and inverse transformed 803 to get a set of residual errors.

These residual errors are added in an adder 804 to the pixel values of a reference block of pixels. The reference block is determined in a motion estimation/compensation 808 or intra prediction 807, depending on whether inter or intra prediction is performed. A selector 809 is thereby interconnected to the adder 804 and the motion estimation/compensation 808 and the intra prediction 807. The resulting decoded block of pixels output from the adder 804 is subject to a deblocking filtering 805 in order to to combat any blocking artifacts.

The deblocking filtering 805 uses deblocking filtering offsets determined as disclosed herein based on depths of pictures in a hierarchical coding structure.

The filtered block of pixels is output form the decoder 800 and is furthermore preferably temporarily provided to a DPB 806 and can be used as a reference block of pixels for a subsequent block of pixels to be decoded. The DPB 806 is thereby connected to make the stored blocks of pixels available to the motion estimation/compensation 808.

The output from the adder 804 is optionally also input to the intra prediction 807 to be used as an unfiltered reference block of pixels. Alternatively, the DPB 806 could be connected to the intra prediction 807

In the embodiments disclosed in FIGS. 15 and 16 the deblocking filtering is the form of so called in-loop filtering. In an alternative implementation at the decoder 800 the deblocking filtering is performed according to so called post-processing filtering. In such a case, the deblocking filtering operates on the output pictures outside of the loop formed by the adder 804, the DPB 806, the intra prediction 807, the motion estimation/compensation 808 and the selector 809.

The encoder and decoder may be a HEVC encoder and decoder e.g. implemented in a mobile terminal. It should however be noted that the embodiments are not limited to HEVC but may be applied to any extension of HEVC such as a scalable extension or multiview extension or to a different video codec, e.g. SHVC or MV-HEVC.

The encoder may, for example, be located in a transmitter in a video camera in e.g. a mobile device or any device for transcoding a video stream. The decoder may, for example, be located in a receiver in a video camera or any other device for displaying a video stream.

Figure 17:
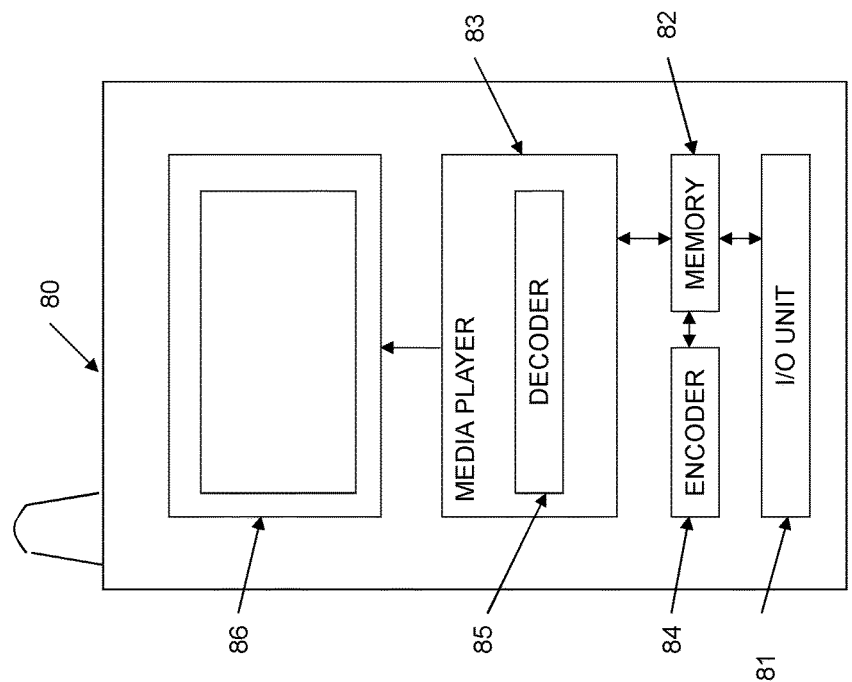
FIG. 17 is a schematic block diagram of a user terminal according to an embodiment.

FIG. 17 is a schematic block diagram of a user terminal 80, represented as a mobile device or telephone, according to an embodiment.

The user terminal 80 can be any device having video encoding and/or decoding functions. Non-limiting examples of such user terminals 80 include mobile telephones and other portable media players, tablets, desktops, notebooks, personal video recorders, multimedia players, video streaming servers, set-top boxes, TVs, computers, decoders, game consoles, video cameras, etc. The user terminal 80 comprises a memory 82 configured to store pictures of a video sequence and/or encoded pictures of a coded video sequence. These encoded pictures can have been generated by the user terminal 80 itself, such as by an encoder 84 connected to the memory 82. Alternatively, the encoded pictures are generated by some other device and wirelessly transmitted or transmitted by wire to the user terminal 80. The user terminal 80 then comprises a transceiver (transmitter and receiver) or input and output unit 81 to achieve the data transfer.

In FIG. 17, the user terminal 80 has been illustrated as comprising both a decoder 85 and a media player 83, with the decoder 85 implemented as a part of the media player 83. This should, however, merely be seen as an illustrative but non-limiting example of an implementation embodiment for the user terminal 80. Also distributed implementations are possible where the decoder 85 and the media player 83 are provided in two physically separated devices are possible and within the scope of user terminal 80 as used herein. A display 86 for display of decoded video data could also be provided as a separate device connected to the user terminal 80 or indeed constituting part of the user terminal 80.

The user terminal 80 of FIG. 17 has been illustrated as both comprising the encoder 84 and the decoder 85. This should, however, merely be seen as an illustrative example. In other embodiments, the user terminal 80 does not comprise any encoder 84 or does not comprise any decoder 85. In the latter case, also the display 86 and media player 83 may be omitted from the user terminal 80.

Hence, an aspect of the embodiments relates to a user terminal 80 comprising an encoder 84 according to the embodiments and/or a decoder 85 according to the embodiments.

The embodiments apply to an encoder, a decoder and any element that operates on a bitstream, such as a network node or a Media Aware Network Element that includes the encoder and/or decoder.

Figure 18:
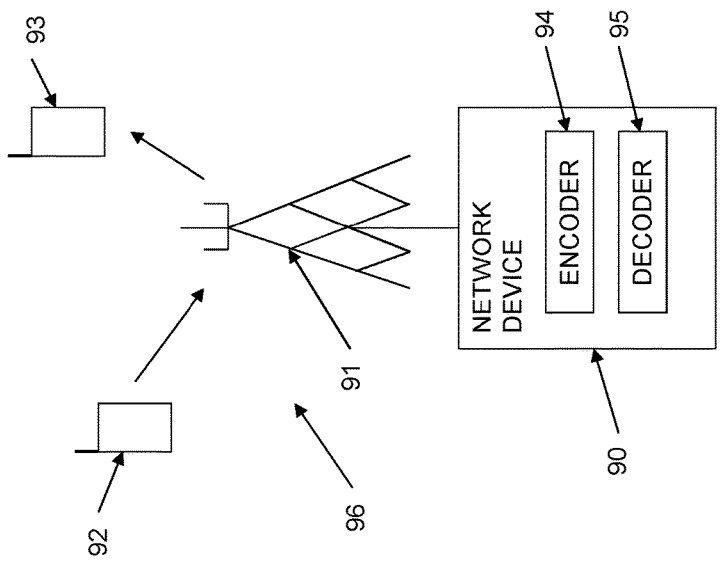
FIG. 18 is a schematic block diagram of a network device according to an embodiment.

FIG. 18 illustrates a network device 90 being or belonging to a network node 91 in a communication network 96, such as a wireless, radio-based communication network. The network device 90 comprises an encoder 94 according to the embodiments and/or a decoder 95 according to the embodiments.

The network device 90 may be a device for converting video according to one video coding standard to another video coding standard, for example, if it has been established that a receiving user terminal 93 is only capable of or prefers another video coding standard than the one sent from a sending user terminal 94. The network device 90 can be in the form of or comprised in a radio base station, a Node-B or any other network node in a communication network 96, such as a radio-based network.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method comprising:
   obtaining a video sequence comprising multiple pictures organized into a hierarchical coding structure having multiple depths, wherein each picture as a whole is associated with a respective one of the multiple depths within the hierarchical coding structure;
   determining and encoding a deblocking parameter value for each picture as a whole, the deblocking parameter value to be used for controlling the application of deblocking filtering to the picture during decoding and being determined as a function of the respective depth of the picture within the hierarchical coding structure, whereby the deblocking parameter values are the same for pictures at a same depth within the hierarchical coding structure; and
   transmitting the deblocking parameter values to a decoder.

2. The method according to claim 1, wherein the deblocking parameter value for each picture controls determination by the decoder of a threshold parameter value for the picture as a whole, the threshold parameter value used to determine whether to apply deblocking filtering for any given block of pixels within the picture.

3. The method according to claim 1, wherein the deblocking parameter value for each picture controls determination by the decoder of a threshold parameter value for the picture as a whole, the threshold parameter value used to determine whether to apply strong deblocking filtering or weak deblocking filtering for any given line of pixels within the picture.

4. The method according to claim 1, wherein the deblocking parameter value for each picture controls determination by the decoder of a clipping threshold parameter value for the picture as a whole, the clipping threshold parameter value used to define pixel value limits for any given pixel values within the picture that are filtered according to weak deblocking filtering or strong deblocking filtering.

5. The method according to claim 1, wherein each depth among the multiple depths corresponds to a different overall picture quality, and wherein determining the deblocking parameter value for each picture as a whole comprises determining the deblocking parameter value as a function of the overall picture quality corresponding to the depth of the picture within the hierarchical coding structure.

6. An encoder comprising:
   a memory storing computer program instructions; and
   a processor configured to execute the computer program instructions, whereby the processor is operative to:
      obtain a video sequence comprising multiple pictures organized into a hierarchical coding structure having multiple depths, wherein each picture as a whole is associated with a respective one of the multiple depths within the hierarchical coding structure;
      determine and encode a deblocking parameter value for each picture as a whole, the deblocking parameter value to be used for controlling the application of deblocking filtering to the picture during decoding and being determined as a function of the respective depth of the picture within the hierarchical coding structure, whereby the deblocking parameter values are the same for pictures at a same depth within the hierarchical coding structure; and transmit the deblocking parameter values to a decoder.

7. The encoder according to claim 6, wherein the deblocking parameter value for each picture controls determination by the decoder of a threshold parameter value for the picture as a whole, the threshold parameter used to determine whether to apply deblocking filtering for any given block of pixels within the picture.

8. The encoder according to claim 6, wherein the deblocking parameter value for each picture controls determination by the decoder of a threshold parameter value for the picture as a whole, the threshold parameter used to determine whether to apply strong deblocking filtering or weak deblocking filtering for any given line of pixels within the picture.

9. The encoder according to claim 6, wherein the deblocking parameter value for each picture controls determination by the decoder of a clipping threshold parameter value for the picture as a whole, the clipping threshold parameter value used to define pixel value limits for pixel values filtered according to weak deblocking filtering or strong deblocking filtering.

10. The encoder according to claim 6, wherein each depth among the multiple depths corresponds to a different overall picture quality and wherein the processor is operative to determine the deblocking parameter value for each picture as a whole as a function of the overall picture quality corresponding to the depth of the picture within the hierarchical coding structure.

11. A method comprising:
receiving and decoding deblocking parameter values for pictures of a video sequence comprising multiple pictures organized into a hierarchical coding structure having multiple depths, wherein each deblocking parameter value corresponds to a respective one of the pictures in the video sequence and was determined as a function of the depth of the picture as a whole within the hierarchical coding structure; and determining, for each picture as a whole, a respective threshold parameter value as a function of the corresponding deblocking parameter value, and using the threshold parameter value to control the application of deblocking filtering to the picture.

12. The method according to claim 11, wherein using the threshold parameter value to control the application of deblocking filtering to the picture comprises using the deblocking parameter value to determine whether to apply strong deblocking filtering or weak deblocking filtering for any given line of pixels within the picture.

13. The method according to claim 11, wherein using the threshold parameter value to control the application of deblocking filtering to the picture comprises using the deblocking parameter value to define a clipping threshold parameter value that controls whether given pixel values within the picture are filtered according to weak deblocking filtering or strong deblocking filtering.

14. A decoder comprising:
a memory storing computer program instructions; and
a processor configured to execute the computer program instructions, whereby the processor is operative to:
receive and decode deblocking parameter values for pictures of a video sequence comprising multiple pictures organized into a hierarchical coding structure having multiple depths, wherein each deblocking parameter value corresponds to a respective one of the pictures in the video sequence and was determined as a function of the depth of the picture within the hierarchical coding structure; and
determine, for each picture as a whole, a respective threshold parameter value as a function of the corresponding deblocking parameter value, and use the threshold parameter value to control the application of deblocking filtering to the picture.

\* \* \* \* \*